United States Patent
Edwards et al.

(10) Patent No.: US 10,769,712 B1
(45) Date of Patent: Sep. 8, 2020

(54) ETA-BASED ITEM PICK-UP AND FULFILLMENT ALTERNATIVES

(71) Applicant: Amazon Technologies, Inc., Seattle, WA (US)

(72) Inventors: Alexander Edwards, Brisbane (AU); Ryan David Hapgood, Belmont, Queensland (AU); Satheesh Narayanan Kolathur, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 233 days.

(21) Appl. No.: 16/036,586

(22) Filed: Jul. 16, 2018

(51) Int. Cl.
  *G06Q 30/06* (2012.01)
  *G06Q 10/10* (2012.01)

(52) U.S. Cl.
  CPC ..... *G06Q 30/0635* (2013.01); *G06Q 10/1095* (2013.01)

(58) Field of Classification Search
  CPC ........................................... G06Q 10/00–50/00
  USPC ................................................ 705/7.11–7.42
  See application file for complete search history.

(56) References Cited

U.S. PATENT DOCUMENTS

| | | | | | |
|---|---|---|---|---|---|
| 4,360,875 | A * | 11/1982 | Behnke | ................... | G01C 21/00 379/93.02 |
| 5,559,707 | A * | 9/1996 | DeLorme | ................ | G01C 21/20 340/990 |
| 6,026,375 | A * | 2/2000 | Hall | ....................... | G06Q 10/08 701/533 |
| 6,253,148 | B1 * | 6/2001 | Decaux | ................... | G08G 1/123 246/5 |
| 6,424,910 | B1 * | 7/2002 | Ohler | ................. | G01C 21/3438 340/988 |
| 6,975,997 | B1 * | 12/2005 | Murakami | .............. | B60L 53/65 705/5 |
| 7,027,995 | B2 * | 4/2006 | Kaufman | ............. | G06Q 10/109 705/7.12 |
| 7,080,019 | B1 * | 7/2006 | Hurzeler | ............. | G06Q 10/025 705/6 |
| 7,082,364 | B2 * | 7/2006 | Adamczyk | ......... | G01C 21/3438 701/485 |
| 7,136,747 | B2 * | 11/2006 | Raney | .................... | G01C 21/20 701/465 |

(Continued)

FOREIGN PATENT DOCUMENTS

EP  2689391 A2 *  1/2014  ......... G06Q 10/0834

*Primary Examiner* — Alan S Miller
(74) *Attorney, Agent, or Firm* — Lee & Hayes, P.C.

(57) ABSTRACT

A customer may place an order for items to be picked up at a merchant location. Upon receiving an indication that the customer is initiating travel to the merchant location to pick up the items, multiple ETA data points for the customer may be determined while the customer is in transit to the merchant location. Based on the ETA data, it may be determined that the customer is likely to arrive after the merchant location closes, which may prevent the customer from being able to pick up the items from the merchant location. Alternative fulfillment options may be presented to the customer to enable the customer to obtain the items. The alternative fulfillment options may include picking up the items at an alternative merchant location, scheduling a delivery of the items, picking up the items from the merchant location at a subsequent time, or facilitating a cancelation of the order.

20 Claims, 7 Drawing Sheets

(56) References Cited

U.S. PATENT DOCUMENTS

| | | | | |
|---|---|---|---|---|
| 7,212,975 B2* | 5/2007 | Bantz | G06Q 10/063 | 705/26.4 |
| 7,353,034 B2* | 4/2008 | Haney | H04W 4/14 | 455/457 |
| 7,856,300 B2* | 12/2010 | Hozumi | B60N 2/99 | 701/49 |
| 8,090,707 B1* | 1/2012 | Orttung | G06Q 10/109 | 707/710 |
| 8,140,256 B1* | 3/2012 | dos-Santos | G06Q 10/025 | 701/117 |
| 8,145,417 B1* | 3/2012 | Chitre | G01C 21/362 | 701/517 |
| 8,150,608 B2* | 4/2012 | Cobbold | G06Q 10/10 | 701/117 |
| 8,285,570 B2* | 10/2012 | Meyer | G06Q 50/14 | 705/5 |
| 8,340,890 B1* | 12/2012 | Cobbold | G06Q 10/10 | 701/117 |
| 9,406,084 B2* | 8/2016 | Havas | G06Q 30/0633 | |
| 9,507,346 B1* | 11/2016 | Levinson | B60W 30/0956 | |
| 10,453,025 B2* | 10/2019 | Agasti | G06Q 10/0836 | |
| 10,460,411 B2* | 10/2019 | Liu | H04L 67/18 | |
| 10,467,579 B1* | 11/2019 | Reiss | G06Q 10/0833 | |
| 10,467,581 B2* | 11/2019 | Laury | G06Q 10/0833 | |
| 2001/0056363 A1* | 12/2001 | Gantz | G06Q 99/00 | 705/500 |
| 2002/0062192 A1* | 5/2002 | Saraga | G06F 16/9537 | 701/465 |
| 2002/0188492 A1* | 12/2002 | Borton | G06Q 30/0202 | 705/7.13 |
| 2003/0100993 A1* | 5/2003 | Kirshenbaum | G01C 21/26 | 701/408 |
| 2003/0109266 A1* | 6/2003 | Rafiah | G01C 21/3423 | 455/456.1 |
| 2003/0177020 A1* | 9/2003 | Okamura | G06Q 10/08 | 705/5 |
| 2003/0177072 A1* | 9/2003 | Bared | G06Q 30/0635 | 705/26.81 |
| 2004/0049424 A1* | 3/2004 | Murray | G06Q 30/0226 | 705/14.14 |
| 2004/0177008 A1* | 9/2004 | Yang | G06Q 10/08 | 705/26.1 |
| 2004/0210621 A1* | 10/2004 | Antonellis | G06Q 10/087 | 709/200 |
| 2005/0033614 A1* | 2/2005 | Lettovsky | G06Q 10/025 | 705/5 |
| 2006/0022048 A1* | 2/2006 | Johnson | H04L 67/18 | 235/462.1 |
| 2006/0076397 A1* | 4/2006 | Langos | G06Q 10/087 | 235/375 |
| 2006/0155460 A1* | 7/2006 | Raney | G01C 21/20 | 701/468 |
| 2006/0276960 A1* | 12/2006 | Adamczyk | G06Q 10/06 | 701/516 |
| 2007/0088624 A1* | 4/2007 | Vaughn | G06Q 50/12 | 705/15 |
| 2007/0106468 A1* | 5/2007 | Eichenbaum | G06Q 30/02 | 701/431 |
| 2008/0054072 A1* | 3/2008 | Katragadda | G08G 1/123 | 235/384 |
| 2008/0082424 A1* | 4/2008 | Walton | G06Q 30/02 | 705/26.1 |
| 2008/0091342 A1* | 4/2008 | Assael | G01C 21/3438 | 701/533 |
| 2008/0319653 A1* | 12/2008 | Moshfeghi | G01C 21/3608 | 701/532 |
| 2009/0006194 A1* | 1/2009 | Sridharan | G06Q 30/0273 | 705/14.62 |
| 2009/0048878 A1* | 2/2009 | Metcalf | G06Q 30/02 | 705/5 |
| 2009/0187488 A1* | 7/2009 | Shamilian | G06Q 20/3224 | 705/16 |
| 2010/0121662 A1* | 5/2010 | Becker | G06Q 10/02 | 705/5 |
| 2010/0274569 A1* | 10/2010 | Reudink | H04W 4/02 | 705/1.1 |
| 2011/0238474 A1* | 9/2011 | Carr | G06Q 30/0259 | 705/14.23 |
| 2012/0191551 A1* | 7/2012 | Lutnick | G06Q 20/20 | 705/15 |
| 2012/0232776 A1* | 9/2012 | Gontmakher | G06Q 10/047 | 701/117 |
| 2012/0239289 A1* | 9/2012 | Gontmakher | G01C 21/3438 | 701/420 |
| 2012/0290652 A1* | 11/2012 | Boskovic | G06Q 50/30 | 709/204 |
| 2012/0296885 A1* | 11/2012 | Gontmakher | G06Q 10/047 | 707/705 |
| 2013/0041941 A1* | 2/2013 | Tomasic | G08G 1/123 | 709/203 |
| 2013/0317921 A1* | 11/2013 | Havas | G06Q 30/0641 | 705/15 |
| 2014/0074743 A1* | 3/2014 | Rademaker | G06Q 10/083 | 705/334 |
| 2014/0279270 A1* | 9/2014 | Bertanzetti | G06Q 30/0635 | 705/26.81 |
| 2015/0161697 A1* | 6/2015 | Jones | G06Q 30/0611 | 705/26.4 |
| 2015/0356502 A1* | 12/2015 | Agasti | H04W 4/12 | 705/339 |
| 2016/0155088 A1* | 6/2016 | Pylappan | G06Q 10/0836 | 705/333 |
| 2016/0247113 A1* | 8/2016 | Rademaker | G06Q 10/063114 | |
| 2016/0292664 A1* | 10/2016 | Gilfoyle | H04W 4/027 | |
| 2018/0060990 A1* | 3/2018 | Liu | H04L 67/16 | |
| 2019/0228375 A1* | 7/2019 | Laury | G05D 1/0088 | |

\* cited by examiner

ETA-BASED ITEM PICK-UP AND FULFILLMENT ALTERNATIVES

BACKGROUND

Consumers are increasingly ordering items in an online environment, such as via a website or a mobile application. Instead of requesting that the ordered items be delivered to a physical location associated with a customer (e.g., a personal residence, a workplace, etc.), the customer may opt to pick up the ordered items from a physical location of a merchant (e.g., a grocery store). The customer may pick up the ordered items from the physical location of the merchant provided that the customer arrives during the hours of operation of that merchant. However, the ordered items will likely be unavailable for pick-up if the customer arrives after the merchant has closed, which may result in a poor customer experience. Provided that the ordered items had been previously picked and assembled for pick-up, the merchant may also be required to restock the assembled ordered items, resulting in additional costs, and possibly the spoilage of perishable items (e.g., frozen or refrigerated food items).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
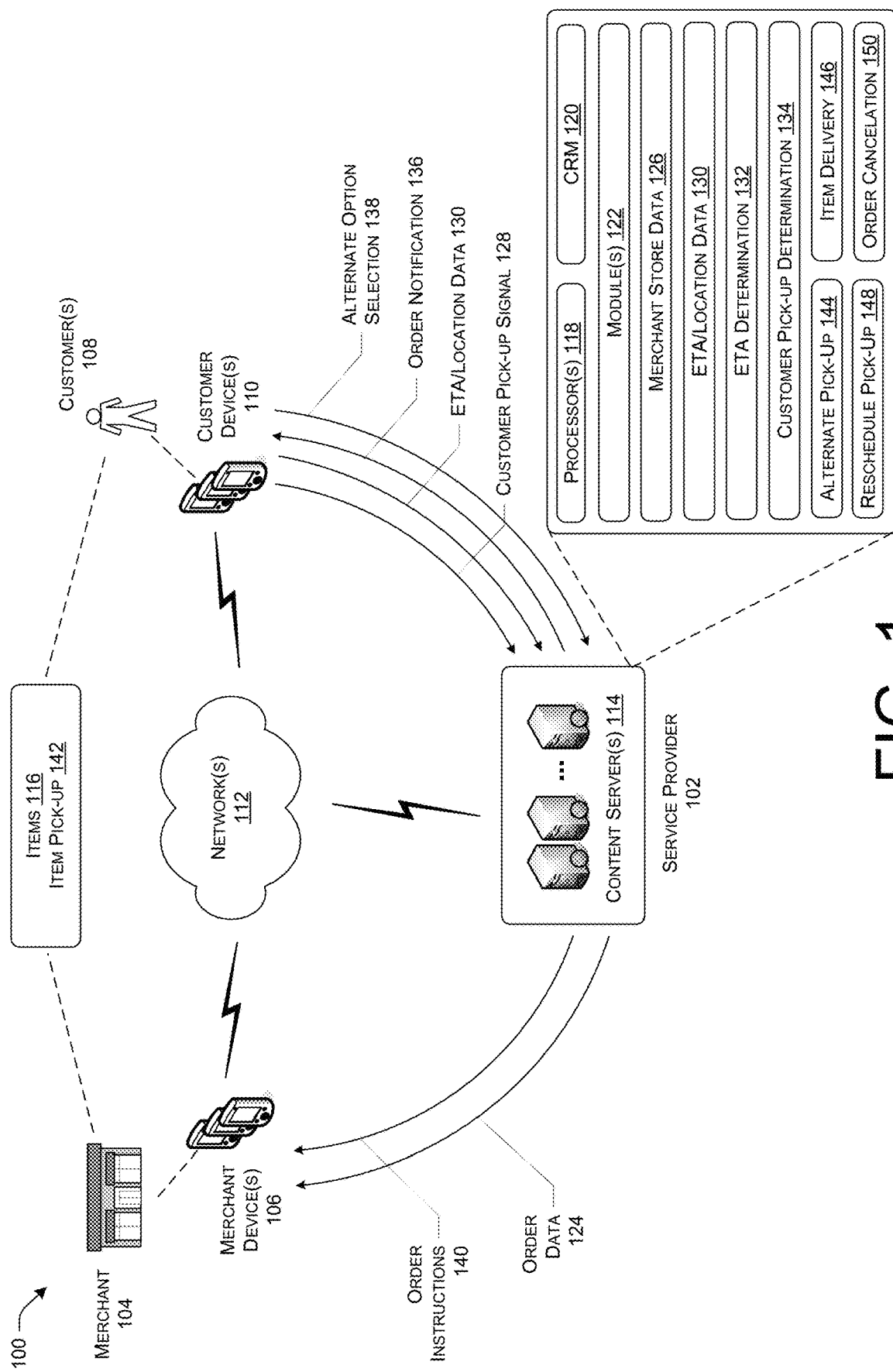
FIG. 1 illustrates an example system for determining an estimated time of arrival ("ETA") of a customer with respect to the pick-up of items at a merchant location and identifying alternative options for fulfilling an order for the items.

Described herein are systems and/or processes for determining, based on estimated time of arrival ("ETA") data associated with a customer that is traveling to pick up items at a merchant location, whether the customer is likely to arrive at the merchant location during its hours of operation. If the ETA data indicates that the customer is likely to arrive after the merchant location closes, the systems and/or processes described herein may notify the customer of alternative options to obtain the ordered items, such as facilitating a delivery of the ordered items at a subsequent time, identifying an alternative merchant location at which the customer could pick up the ordered items, rescheduling the pick-up of the items at the merchant location at a subsequent time, or canceling the order for the items (and possibly offering a full or partial refund). In particular, using one or more sensors (e.g., location sensor, accelerometer, etc.) of a customer device (e.g., a mobile telephone) of the customer, the systems and/or processes described herein may estimate when the customer is likely to arrive at the merchant location at which the customer is schedule to pick up items that he/she previously ordered. Since the systems and/or processes described herein store, or at least have access to, the hours of operation of that merchant location, an ETA of the customer may indicate that the customer is likely to arrive after the merchant location has closed. The customer may be notified that the merchant location will likely close before the customer arrives, and one or more of the alternative options noted above may be presented to the customer.

In various embodiments, a service provider may receive orders for items (e.g., food items) that are fulfilled by merchants (e.g., a grocery store merchant). Although the items may be delivered to customers that place the orders for the items, the customers may also have the option to pick up the items at a merchant location of the merchant (e.g., a physical grocery store or pick-up location). The service provider may identify a time slot/period for the customer to pick up the ordered items, or the customer may be provided with options to select a particular time slot/period for pick-up. Ordering of the items and/or the selection or assignment of the time slot/period may be performed using a mobile application or website that is associated the service provider and that is accessible via customer devices of customers.

When the customer begins traveling or initiates travel to the merchant location to pick up the ordered items, the customer may send an indication to the service provider. For example, the customer may select an "on my way" button via the mobile application. In some instances, upon receiving this indication, the service provider may send instructions to the merchant location to pick and/or assemble the items included in the customer's order. Moreover, during travel to the merchant location, the service provider may obtain or the customer device may provide location data that indicates a current location of the customer device and/or ETA data that indicates when the customer is likely to arrive at the merchant location. Provided that the location data is provided, the service provider may calculate the ETA of the customer. The ETA of the customer may be received or calculated continuously and periodically while the customer is in transit to the merchant location, resulting in multiple data points that indicate the likely arrival time of the customer as the customer travels closer to the merchant location.

In some embodiments, the multiple ETA data points may be smoothed to eliminate or disregard outlier data points that are not indicative of an accurate ETA of the customer. Moreover, the customer ETA determined by the service provider or received from the customer device may be modified based on customer data associated with the customer, such as a driving behavior of the customer that has been collected over time. The customer data may include routes previously taken by the customer, whether the customer typically takes short-cuts, drives over or under the speed limit, and so on. The customer ETA may also be modified based on information or data about the particular merchant location. In particular, the service provider may maintain historical data relating to customers traveling to the merchant location from different areas or directions, including route information. Modifying the customer ETA using the customer data and/or the merchant location data may result in a more accurate ETA for the customer.

The service provider may maintain, or at least have access to, the hours of operation of the merchant location at which the customer is to pick up the ordered items, as well as the hours of operation of other merchant locations of the same merchant and/or different merchants. As a result, the service provider may determine whether the customer ETA indicates that customer will arrive at the merchant location during its hours of operation (e.g., when the merchant location is open), or after the merchant location has closed. If the customer will likely arrive at the merchant location during its open hours, the customer may continue to pick up his/her ordered items.

However, if customer ETA indicates that the customer is likely to arrive after the merchant location closes, or after a threshold amount of time (e.g., 5 minutes) after the merchant location closes, the customer would likely be unable to pick up the ordered items at that time. In response, the service provider may notify, via the mobile application or the website, the customer that he/she is likely to arrive at the merchant location after the merchant location closes. Via this notification, the service provider may also identify alternate options for obtaining the items, such as scheduling a delivery of the ordered items at a subsequent time (e.g., to a residence of the customer), identifying an alternate merchant location at which the customer could pick up the ordered items, rescheduling pick-up of the items at the merchant location at a subsequent time during the hours of operation of the merchant location, or canceling the order for the items (and possibly offering a full or partial refund). The customer may select one of these options via the mobile application/website. Alternatively, the customer may proceed to travel to the merchant location, while being aware of the risk that the merchant location may be closed when he/she arrives.

FIG. 1 illustrates an example system 100 for determining, based on a customer ETA of a customer, whether the customer is likely to arrive at a merchant location to pick up items prior to a closing time of the merchant location. If not, one or more alternate options for obtaining the items may be provided to the customer. As shown in FIG. 1, the system 100 may include a service provider 102, one or more merchants 104, merchant devices 106 associated with the one or more merchants 104, one or more customers 108, and customer devices 110 associated with the customers 108. The service provider 102, the merchant devices 106, and/or the customer devices 110 may communicate via one or more networks 112. As shown, the service provider 102 may include, or be associated with, one or more content server(s) 114.

As stated above and herein, the service provider 102 may provide and/or maintain functionality that allows the service provider 102 to determine when a customer 108 is on his/her way to pick up items from a merchant location of a merchant 104, such as a brick-and-mortar store or pick-up location (also referred to herein as a "physical location," a "store location," or a "physical store location"). When the customer orders items via a mobile application or web site associated with the service provider 102, the customer 108 may elect to pick up the items at a merchant location of the merchant 104 (or the service provider 102) that is preparing, providing, assembling, and/or packaging the ordered items. When the customer 108 initiates travel to the merchant location to pick up the ordered items, the customer 108 may indicate that via the mobile application/website, which causes such information to be transmitted to the content server(s) 114 of the service provider 102. This signal indicates a current location of the customer 108. The customer device 110 and/or the service provider 102 continuously calculates an ETA of the customer 108, where the ETA indicates an estimated time that the customer 108 will likely arrive at the merchant location.

Based on the customer ETA, the service provider 102 may send instructions to the merchant location to begin preparing the ordered items for pick-up, which may include picking the ordered items and/or assembling the ordered items. Since the service provider 102 and/or the content server(s) 114 may receive or determine periodic ETA updates for the customer 108 as the customer 108 is travelling to the merchant location, the service provider 102 may send such instructions to the merchant location when the customer 108 is within a threshold distance from, or is within a threshold amount of time from arriving at, the merchant location. In particular, preparing the ordered items for pick-up may include obtaining the ordered items from shelving, a refrigerator, a freezer, etc., and packaging the items in bags or boxes. As a result, the ordered items are ready for pick-up when the customer 108 arrives at the merchant location. This may allow for minimal wait time for the customer 108 once the customer 108 actually arrives at the merchant location. This may also minimize the amount of time spent by individuals at the merchant location to provide the ordered items to the customer 108 once the customer 108 arrives, which may reduce costs of the merchant location. Awareness of the likely arrival time of the customer 108 may also reduce the amount of time that items are waiting to be picked up, which may be important for perishable, refrigerated, and/or frozen items.

As stated above, the service provider 102 may receive from the customer device 110, or calculate, an ETA of the customer 108 periodically. If the current ETA of the customer 108 is equal or less than a check-in ETA threshold (e.g., 5 minutes, 10 minutes, etc.), the service provider 102 may automatically check in the customer 108. At that point, an individual (or an automated mechanism) may begin gathering the ordered items for pick-up. Moreover, when it is determined that the current ETA of the customer 108 is equal to or less than an arrival threshold (e.g., 1 minute, 2 minutes, etc.), the service provider 102 may determine that the customer 108 has arrived, or will shortly arrive at the merchant location. Via an instruction from the service provider 102, or via a device maintained by the merchant location, an individual at the merchant location may greet the customer 108 when he/she arrives, and the ordered items may be provided to the customer 108.

In various embodiments, the service provider 102 may be any entity, server(s), platform, etc., that offers items 116 (e.g., products, services, food/drink items, etc.) to customers 108 via an electronic marketplace (e.g., a website, a mobile application, etc.) associated with the service provider 102. That is, the customers 108 may access the electronic marketplace via corresponding customer devices 110 for the purpose of searching for, viewing, selecting, acquiring (e.g., purchasing, leasing, renting, borrowing, lending, etc.), etc., items 116. The items 116 may be provided directly by the service provider 102, or may be provided by the service provider 102 on behalf of a different entity, such as the merchants 104. That is, via a website, an electronic marketplace, and/or a mobile application associated with the service provider 102, the customers 108 may place orders for items 116 to be provided by the merchants 104. Alternatively, customers 108 may place orders directly with the merchants 104, such as via a merchant website, a mobile application associated with a merchant 104, etc. In some embodiments, provided that one or more ordered items 116 are to be prepared/provided by a merchant 104, the merchant 104 may prepare/provide the item(s) 116 at one or more physical merchant locations of the merchant 104 (e.g., a warehouse, a retail store, a fulfillment center, etc.). If a merchant 104 is mobile in nature and offers items 116 at different locations at different times (e.g., a food truck), the mobile merchant 104 may prepare/provide the ordered items 116 at their current location. The ordered items 116 may be delivered to a delivery location associated with the customer 108 (e.g., a residence, a workplace, etc.), or the ordered items 116 may be picked up by the customer 108 at a physical merchant location of the merchants 104.

The merchants 104 may include any entity that provides items 116 (e.g., products, services, etc.) to the customers 108. The items 116 may be offered for sale, lease, rent, etc., via a physical merchant location (e.g., a brick-and-mortar retail store), via a merchant-branded website (and/or a website associated with the service provider 102 or another entity), or via an application that resides on the customer devices 110. The items 116 may be offered by the service provider 102 via a mobile application or website, ordered by the customer 108 via the mobile application/web site, and the items 116 may be picked up by the customer 108 at one of one or more merchant locations of the merchant 104. For instance, assuming that a merchant 106 is a grocery store chain having multiple physical grocery stores in a region, the customer 108 may select which physical grocery store that he/she would like to pick up the ordered items 116. In some embodiments, the merchant 104 may be the service provider 102 itself, or may be associated with the service provider 102. For instance, the items 116 ordered by the customer 108 via the mobile application/website of the service provider 102 may be picked up at a physical retail location or a physical pick-up location of the service provider 102. Moreover, regardless of whether the physical location is associated with the service provider 102 or a third-party merchant 104, any type of items 116 may be ordered and picked up, including food or drink items 116, flowers, non-food/drink items 116 (e.g., electronics, houseware, clothing, music, videos, etc.), and so on.

Each merchant 104 may have one or more associated merchant devices 106. In some embodiments, a merchant 104 may be associated with multiple merchant devices 106 such that individual employees or representatives of the merchant 104 may operate a merchant device 106 (e.g., handheld device, tablet, terminal, a point-of-sale (POS) system/device, a device to receive payment, etc.). The merchant devices 106 may be used by the merchants 104 to determine the ETA of customers 108, receive instructions from the service provider 102, check in customers 108, identify orders placed by customers 108, identify items 116 that are to be picked up by customers 108, send notifications to customers 108, and so on.

Moreover, the customers 108 may include any person or entity that interacts with the service provider 102 and/or merchants 104 for the purpose of ordering, acquiring, purchasing, etc., items 116 from the service provider 102 on behalf of the merchants 104. As discussed herein, the customers 108 may include in-store customers 108 that purchase or consume the items 116 provided by the merchants 104 at the current physical location of the merchants 104, or remote customers 108 that order items 116 via the service provider 102 (e.g., the mobile application or website) and travel to the merchant location to pick up the ordered items 116. Provided that an ETA of a customer 108 indicates that he/she will arrive after a closing time of the merchant location, the customer 108 may receive the ordered items 116 via delivery. The customers 108 may interact with the service provider 102 and/or the merchants 104 via corresponding customer devices 110, which may include cellular telephones, tablet devices, laptop computers, desktop computers, gaming consoles, electronic book (eBook) reader devices, and so on. The customer devices 110 may be used by the customer 108 to place an order for items 116, determine a route to the merchant location, determine and/or send location data and/or ETA data to the service provider 102, check in at the merchant location, select one or more alternative options to obtain the ordered items 116, and so on.

The network(s) 112 may facilitate communications and/or interactions between the content server(s) 114 of the service provider 102, the merchant devices 106, and/or the customer devices 110. The network(s) 112 may facilitate such communications/interactions via any type of network, such as a public wide-area-network (WAN) (e.g., the Internet), which may utilize various different technologies including wired and wireless technologies. Moreover, the content servers 114 may contain any number of servers that are possibly arranged as a server farm. Other server architectures may also be used to implement the content servers 114.

Moreover, the merchant devices 106, the customer devices 110, and/or the content servers 114 may include one or more processors 118 and computer-readable media 120, which is indicated in FIG. 1 as "CRM.". The processor(s) 118 may execute one or more modules 122 and/or processes to cause the merchant devices 106, the customer devices 110, and/or the content servers 114 to perform a variety of functions, as set forth above and explained in further detail in the following disclosure. In some embodiments, the processor(s) 118 may include a central processing unit (CPU), a graphics processing unit (GPU), both CPU and GPU, or other processing units or components known in the art. Additionally, each of the processor(s) 118 may possess its own local memory, which also may store program modules, program data, and/or one or more operating systems.

The computer-readable media 120 may include volatile memory (such as RAM), non-volatile memory (such as ROM, flash memory, miniature hard drive, memory card, or the like), or some combination thereof. The computer-readable media 120 may be non-transitory computer-readable media 120. The computer-readable media 120 may include, or be associated with the one or more modules 122 that perform various operations associated with the merchant devices 106, the customer devices 110, and/or the content servers 114. In some embodiments, the one or more modules 122 may include or be associated with computer-executable instructions that are stored by the computer-readable media 120 and that are executable by the processor(s) 118 to perform such operations. The merchant devices 106, the customer devices 110, and/or the content servers 114 may also include additional components not listed above that may perform any function associated with the merchant devices 106, the customer devices 110, and/or the content server(s) 114.

Via the mobile application and/or website associated with the service provider 102, the customer 108 may place an order for one or more items 116 that are to be fulfilled by a merchant 104 (or the service provider 102). When placing the order, the service provider 102 may indicate that the items 116 are to be picked up at a merchant location of the merchant 104, or the customer 108 may select a specific merchant location of one or more merchant locations of the merchant 104 for pick-up of the ordered items 116. Provided that a merchant location is to prepare/provide the ordered items 116 for pick-up, the service provider 102 may send order data 124 to a merchant device 106 at that merchant location. The order data 124 may identify the items 116 included in the order, the customer 108 that placed the order, a time slot or period (e.g., 3:00-5:00 pm) for pick-up of the ordered items 116, and any other information that could be used to identify the items 116 at the merchant location for assembly, assemble the ordered items 116, and provide the ordered items 116 when the customer 108 arrives at the merchant location.

In various embodiments, the service provider 102 may maintain, or at least have access to, merchant store data 126 associated with different merchants 104 and/or merchant locations. For a particular merchant 104, the merchant store data 126 may indicate one or more merchant locations, stores, or pick-up locations of the merchant 104, the hours of operation of those merchant locations (indicating when each merchant location is open or closed), an inventory of items 116 at each merchant location, a number of employees at each merchant location at different times, a number of orders that each merchant location is currently processing of fulfilling, and/or a number of orders that each merchant location has yet to process or fulfill. The number of currently processed orders and the number of unfulfilled orders may indicate a current and future capacity of the merchant locations to fulfill future orders, as well as an estimated wait time for customers 108 when the customers 108 arrive at the merchant locations to pick up ordered items 116.

Provided that a customer 108 placed an order for one or more items 116 to be picked up at a merchant location, the customer 108 may indicate when he/she is initiating travel or is traveling to the merchant location to pick up the ordered item(s) 116. This customer pick-up signal 128 may constitute the customer 108 sending a message (e.g., a text message, an e-mail message, a chat message, etc.) to the service provider 102, or the customer 108 indicating that he/she is leaving to travel to the merchant location via the mobile application/website of the service provider 102. Either concurrently with placement of the order, or at a subsequent time, the customer 108 may press a button indicating that he/she is traveling to the merchant location to pick up the ordered items 116 (e.g., an "on my way" button). Accordingly, the customer pick-up signal 128 may indicate to the service provider 102 and/or the merchant location that the customer 108 intends to pick up the ordered items 116.

Upon receiving the customer pick-up signal 128, the service provider 102 may receive, from the customer device 110 of the customer 108, location data (e.g., GPS data) indicating a current location of the customer 108. As will be described in additional detail herein, based on the current location of the customer 108, the geographic location of the merchant location, a scheduled route between the current location of the customer 108 and the geographic location of the merchant location, and possibly other factors (e.g., current weather conditions, current traffic conditions, a mode of transportation of the customer 108, etc.), the service provider 102 may determine/calculate a customer ETA that indicates a time at which the customer 108 is expected to arrive at the merchant location. The customer ETA may also be referred to herein as "ETA/location data 130." In other embodiments, the ETA/location data 130 may be received directly from the customer device 110. For instance, a mobile application residing on the customer device 110 (e.g., a maps application) may determine the customer ETA with respect to the merchant location and send corresponding ETA/location data 130 to the service provider 102.

The service provider 102 may determine or receive a customer ETA of the customer 108 on a periodic basis (e.g., every second, every 30 seconds, every minute, every 2 minutes, etc.) as the customer 108 is traveling to the merchant location. As a result, the service provider 102 may be aware of the likely time of arrival of the customer 108 as the customer 108 is traveling closer and closer to the merchant location. From the multiple data points that indicate the ETA of the customer 108 at different times, the service provider 102 may arrive at an ETA determination 132 for the customer 108 with respect to the merchant location. The ETA determination 132 may be based on the ETA/location data 130 and may indicate a predicted time in which the customer 108 is to arrive at the merchant location.

As stated above, the service provider 102 may maintain, or at least have access to, the hours of operation (also referred to herein as "hours of pick-up") of each merchant location. The hours of operation may indicate when the merchant location is open, closed, period of time in which the merchant location is available to facilitate the pick-up of items 116, and/or periods of time in which the merchant location is unable to facilitate the pick-up of items 116 (e.g., a time in which individuals/employees at the merchant location are scheduled to have lunch). Based on the ETA determination 132 and the time at which the merchant location closes, the service provider 102 may determine whether the customer 108 is likely to arrive at the merchant location prior to the closing time (e.g., a "customer pick-up determination 134"). If so, the customer 108 will proceed to the merchant location to pick up the ordered items 116 (e.g., "item pick-up 142"). For instance, if the merchant location closes at 5:00 pm and the ETA determination 132 is 4:50 pm, the customer 108 will likely arrive before 5:00 pm and, therefore, will be able to pick up the ordered items 116.

However, based on the ETA determination 132 and the closing time of the merchant location, the customer pick-up determination 134 may be that the customer 108 is likely to arrive at the merchant location after the merchant location closes. Using the example above, if the merchant location closes at 5:00 pm and the ETA determination 132 indicates that the customer 108 is likely to arrive at 5:15 pm, the customer 108 will likely arrive after 5:00 pm. In some instances, the customer 108 may have stated that he/she was on his/her way at a time at which the merchant location was open, but the customer ETA indicates that the merchant location will likely be closed when he/she arrives. As a result, the customer 108 may be unable to pick up the ordered items 116 at the merchant location when he/she arrives. Based on this customer pick-up determination 134, and the relatively high likelihood that the customer 108 will be unable to pick up his/her items 116 when he/she arrives at the merchant location, the service provider 102 may identify one or more alternative options for the customer 108 to obtain the ordered items 116. The one or more alternative options may be provided to the customer 108 via an order notification 136 that is sent to the customer device 110 of the customer 108 (e.g., via the mobile application, a text message, an e-mail message, etc.). The customer 108 may select one of the alternative options (i.e., alternate option selection 138) and, as a result, the service provider 102 may send order instructions 140 to the merchant location, where the order instructions 140 indicate that the customer 108 will not be picking up the ordered items 116 prior to the merchant location closing.

Via the order notification 136, the service provider 102 may indicate that the customer 108 is unlikely to arrive at the merchant location prior to a closing time, and that the customer 108 will need to obtain the ordered items 116 in a different manner. The order notification 136 may identify alternative options for obtaining the ordered items 116, such as alternate pick-up 144, which may allow the customer 108 to pick up the ordered items 116 at a different merchant location of the merchant 104 (e.g., a different grocery store). The alternate pick-up 144 may be contingent on the hours of operation of the alternate merchant location, the customer ETA to that alternate location, and/or whether some or all of ordered items 116 are included within an inventory of the alternate location (i.e., whether the ordered items 116 are available at the alternate merchant location). The order notification 136 may also propose item delivery 146, which, if selected, may cause the ordered items 116 to be delivered to a location of the customer 108 (e.g., a residence, a workplace, etc.) at a subsequent time (e.g., later in the day, the next day, etc.). Moreover, the order notification 136 may include reschedule pick-up 148, which may allow the customer 108 to reschedule pick-up 148 of the ordered items 116 at a subsequent time (e.g., later in the day, the next day, etc.), either at the merchant location or an alternate merchant location. The order notification 136 may also include order cancelation 150, which may allow the customer 108 to cancel the order for the items 116, and possibly receive a full or partial refund. Each of the alternate options presented via the order notification 136 may include an additional fee to be incurred by the customer 108. As illustrated, data/information representative of the options for alternate pick-up 144, item delivery 146, reschedule pick-up 148, and/or order cancelation 150 may be generated and maintained by the content server(s) 114.

The order instructions 140 sent to the merchant location may be based on the alternate option selected by the customer 108 (e.g., the alternate option selection 138). For instance, for alternate pick-up 144, the order instructions 140 may instruct the merchant location to restock or restage the ordered items 116 (if they have been picked and assembled), and may instruct an alternate merchant location to assemble the ordered items 116 for pick-up. For item delivery 146, if the ordered items 116 have already been assembled for pick-up, the order instructions 140 may instruct the merchant location to facilitate a delivery of the ordered items 116, or to assemble/package the ordered items 116 for delivery. As for reschedule pick-up 148, the order instructions 140 may instruct the merchant location to maintain the assembled items 116 for a subsequent pick-up. For order cancelation 150, the order instructions 140 may instruct the merchant location to restock or restage the assembled ordered items 116 or to refrain from assembling the ordered items 116 for pick-up.

Figure 2:
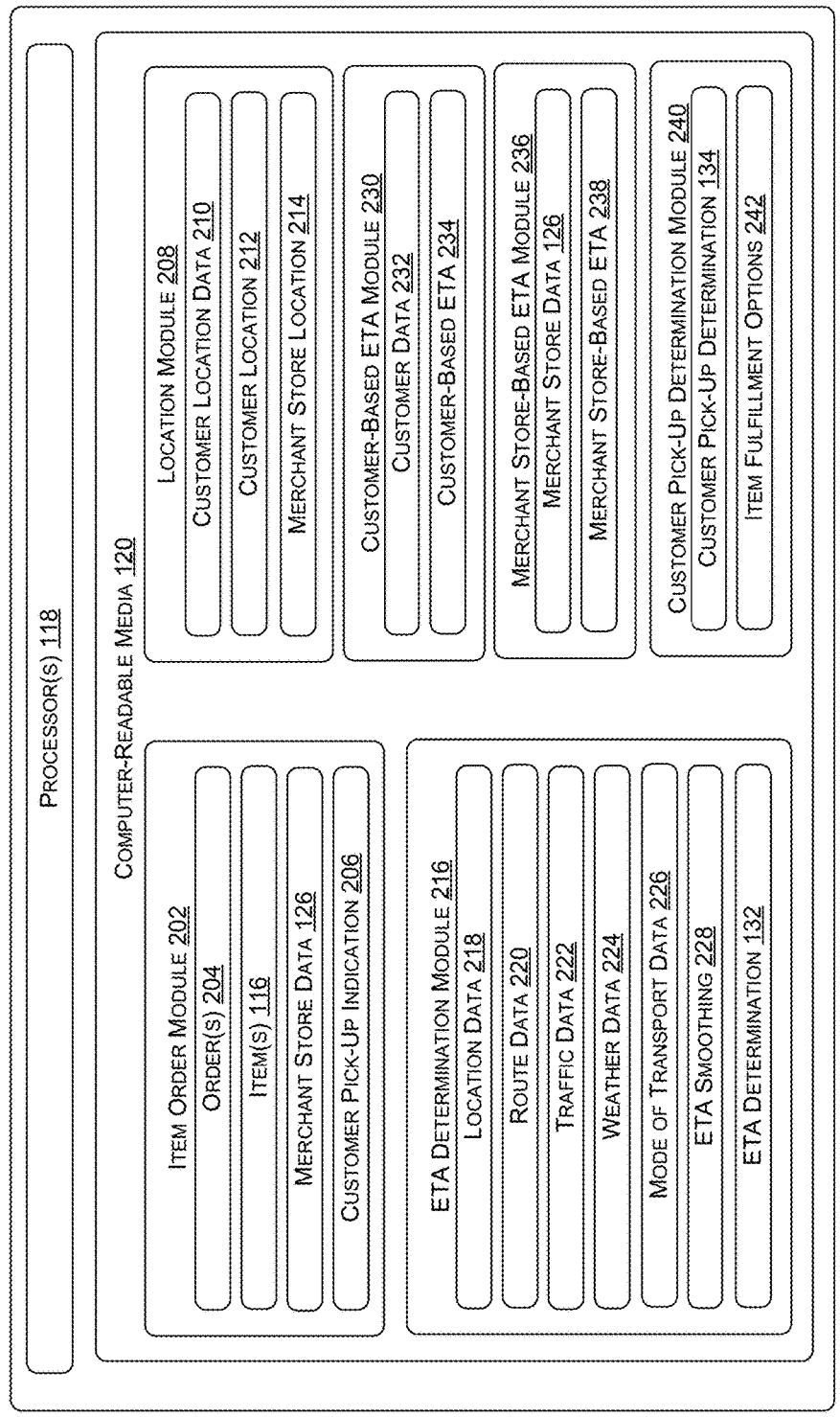
FIG. 2 illustrates an example content server that determines an ETA of a customer with respect to the pick-up of items at a merchant location and identifying alternative options for fulfilling an order for the items.
Figure 2:
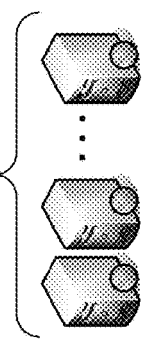

FIG. 2 illustrates an example system 200 that depicts the content server(s) 114 illustrated in FIG. 1. As shown, the content server(s) 114 includes the one or more processor(s) 118, the computer-readable media 120, and various modules 122. In some embodiments, the service provider 102 may determine, based on a customer ETA of a customer 108, whether the customer 108 is likely to arrive at a merchant location to pick up items 116 prior to a closing time of the merchant location. If not, one or more alternate options for obtaining the items 116 may be provided to the customer 108.

In various embodiments, the computer-readable media 120 may include an item order module 202. As described with respect to FIG. 1, the service provider 102 may receive, from customer devices 110 of customers 108, orders 204 for items 116 to be picked up from a particular merchant location. The service provider 102 may also maintain, or at least have access to merchant store data 126 associated with one or more merchant locations. For instance, via a web site or mobile application associated with the service provider 102, a customer 108 may shop and place an order for food items 116 to be provided by a grocery merchant 104 that has multiple store locations. Instead of having the food items 116 delivered, the customer 108 may select one of the store locations to pick up the ordered food items 116, as well as a time period/slot (e.g., 3:00-5:00 pm) at which the customer 108 is scheduled to pick up the food items 116. While placing the order 204, or at a later time, the customer 108 may indicate that he/she is leaving to pick up the ordered items 116 (e.g., the customer pick-up signal 128), meaning that the customer 108 is beginning to travel to the merchant location. As stated herein, the customer pick-up signal 128 may result from the customer 108 sending an e-mail message, a text message, a chat message, possibly via the mobile application/website, or from the customer 108 selecting a button or other selectable option via the mobile application/website. A determination that the customer 108 has begun traveling to the merchant location to pick up the ordered items 116 may be referred to herein as a "customer pick-up indication 206."

Upon an occurrence of the customer pick-up indication 206, meaning that the customer 108 is traveling to the merchant location to pick up the ordered items 116, a location module 208 may determine or receive customer location data 210 associated with the customer device 110 of the customer 108. The customer location data 210 may be GPS data and may indicate a current customer location 212 of the customer 108. The location data 210 may be obtained via the mobile application of the service provider 102 or by one or more sensors (e.g., location sensor, GPS sensor, etc.) of the customer device 110. Provided that the customer 108 is currently traveling to the merchant location, the customer location data 210 and the corresponding current customer location 212 will change over time. In other embodiments, the customer location data 210 can be obtained and/or received from the customer device 110 at any time, including when the customer 108 opens and/or interacts with the mobile application used to place orders 204, when the customer 108 selects a merchant 104 in which he/she would like to order items 116 from, when the customer 108 selects a merchant location of the merchant 104 at which to pick up the items 116, when the customer 108 places the order 204, and/or when the customer 108 indicates that he/she is beginning to travel to the merchant location. In various embodiments, the customer location data 210 will not be collected by the customer device 110 or the mobile application, and will not be sent to the service provider 102, the merchant 104, and/or the merchant location unless the customer 108 first opts in to (e.g., agrees to) the collection and sharing of such customer location data 210.

In some embodiments, the customer 108 may select a merchant location at which the customer 108 would like to pick up the ordered items 116. If the customer location data 210 indicates that the customer ETA of the customer 108 with respect to that merchant location is after the merchant location closes (or is after a closing time plus a threshold amount of time), the customer 108 may be notified at that time. For instance, assume that the merchant location closes at 5:00 pm, the customer 108 chooses that merchant location at 4:45 pm, and the customer ETA with respect to the merchant location is 30 minutes, indicating that the customer 108 is likely to arrive at the merchant location at 5:15 pm. Since this is after the merchant location closes, the mobile application/website may notify the customer 108, which may prevent the customer 108 from placing an order 204 that the merchant location will be unable to fulfill. Upon receiving this notification, the customer 108 may select a different merchant location, or schedule a time or time period to pick up the items 116 from that same merchant location at a later time.

In addition to maintaining merchant store data 126 associated with different merchant locations, the location module 208 may also maintain, or at least have access to, merchant store location 214. The merchant store location 214 may identify the geographic locations of different merchant locations at which customers 108 may pick up items 116 included in an order 204. The merchant store location 214 may include addresses of the merchant locations, directions to the merchant locations, description of the surrounding areas, information about parking lots/areas, areas at the merchant location where items 116 are picked up by customers 108, and so on.

The computer-readable media 120 may also include an ETA determination module 216. In some embodiments, the customer device 110 of the customer 108, or a mobile application residing on the customer device 110 (e.g., a maps application), may determine a customer ETA for the customer 108 with respect to the merchant location at which the customer 108 is to pick up his/her ordered items 116. The customer device 110 may send the customer ETA to the content server(s) 114 of the service provider 102, or the service provider 102 may collect the customer ETA from the customer device 110. The customer ETA may be send by the customer device 110 periodically while the customer 108 is traveling to the merchant location, such that the service provider 102 is aware of the likely arrival time of the customer 108 at the merchant location in real-time (or near real-time). Therefore, in this embodiment, the customer device 110, or a mobile application residing thereon (e.g., a maps application, a mobile application associated with the service provider 102, etc.), may compute and send the ETA of the customer.

In other embodiments, the service provider 102 may determine the customer ETA of the customer 108 as the customer 108 is traveling to the merchant location. Here, the service provider 102 may determine, receive, and/or collect/obtain location data 218 (e.g., raw GPS data). The location data 218 may correspond to the customer location 212, which may indicate a current location of the customer device 110, which may indicate a current location of the customer 108. Moreover, the location data 218 may consider or indicate a velocity/speed or acceleration of the customer 108 as the customer 108 is in transit to the merchant location, as well as a change in velocity/speed or a change in acceleration. The location data 218 may also correspond to a physical location of the merchant location (e.g., the merchant store location 214) at which the customer 108 is to pick up the ordered items 116. As stated herein, the merchant store location 214 may include an address of the merchant location, a description of the surroundings of the merchant location, directions to the merchant location, and so on. Accordingly, the customer ETA of the customer 108 may be based on the initial location when the customer 108 indicates that he/she is on his/her way to the merchant location, a current location of the customer 108, and/or a physical location of the merchant location.

The customer ETA may also be based on route data 220. The route data 220 may correspond to a route that the customer 108 is taking, and/or a route that the customer is scheduled to take, with respect to the customer 108 traveling to the merchant location. The route data 220 may be determined by the service provider 102 and/or by a mobile application that resides on the customer device 110, which may be associated with the service provider 102 or a third-party entity. The customer ETA may also consider traffic data 222 and/or weather data 224. In particular, data indicating traffic along the route taken by the customer 108 to the merchant location may impact the customer ETA of the customer 108. For instance, an increased amount of traffic along the route and/or near the merchant location may cause the customer 108 to travel to the merchant location at a slower rate, which may result in an increased customer ETA. However, if the customer 108 is traveling to the merchant location during the night (e.g., 2:00 am), a decreased amount of traffic may be experienced and the customer ETA may decrease. Moreover, inclement weather or road conditions (e.g., rain, snow, ice, etc.) and/or the customer 108 traveling to the merchant location when it is dark (e.g., the evening, nighttime, early morning, etc.) may cause an increased customer ETA. In various embodiments, the traffic data 222 may be based on the time of day in which the customer 108 is traveling, such as during rush hour (e.g., 7:00-9:00 am and 4:00-6:00 pm).

The customer ETA may also be calculated based on historical data, such as historical traffic data 222 and/or historical weather data 224. For instance, the customer ETA may be determined based on previous traffic conditions on a route that the customer 108 is scheduled to take to the merchant location, or previous traffic conditions near the merchant location. Time of day (e.g., rush hour, late at night, etc.) or time of year (e.g., winter) may also be considered when calculating the customer ETA.

In some instances, the customer ETA may be determined once the current location of the customer 108 is determined. For instance, since the service provider 102 is aware of the physical locations of the various merchant locations, the customer device 110 and/or the service provider 102 may determine the customer ETA to a merchant location based on the current location of the customer 108. The customer ETA may be received, determined, or calculated once the customer 108 selects a specific merchant location at which the customer 108 desires to pick up items 116, and such a selection may occur before the customer 108 actually places an order 204 for the items 116. Based on the customer ETA to a single merchant location, or possibly multiple different merchant locations, the service provider 102 may advise the customer 108 as to which merchant location the customer 108 should pick up the items 116. The service provider 102 may also recommend a time slot/period that the customer 108 should pick up the ordered items 116 based on the customer ETA to a particular merchant location. This may be based on current or expected traffic/weather conditions, an availability of different merchant locations to fulfill orders 204, and so on.

In certain embodiments, the customer ETA for the customer 108 may be calculated based on mode of transport data 226. In particular, the customer 108 may travel to the merchant location in one of many ways, such as using a car, a bicycle, running, walking, public transportation (e.g., a bus, train, etc.), and so on. The customer ETA for the customer 108 will likely vary based on the particular mode of transportation that the customer 108 is currently using. For instance, a customer ETA when the customer 108 is driving will likely be significantly less that a customer ETA when the customer 108 is walking or riding a bicycle. The mode of transportation currently being used by the customer 108 may be identified by the customer 108, such as via the mobile application when the customer 108 places the order 204 or indicates that he/she is on his/her way. In other embodiments, the mode of transportation may be inferred by the service provider 102 based on a customer profile of the customer 108 or a past or current velocity in which the customer 108 has/is traveling.

As described herein, while the customer 108 is traveling to a particular merchant location, the customer device 110 may calculate a customer ETA with respect to that merchant location at periodic or random intervals. Similarly, the service provider 102 may calculate the customer ETA. In either scenario, the service provider 102 may have access to multiple data points that indicate a customer ETA of the customer 108, where each data point corresponds to a current location of the customer 108/customer device 110 and a particular time in which the current location was captured while the customer 108 is traveling to the merchant location. However, some of the ETA data points may be inaccurate, or may deviate from other ETA data points that have been collected. Based on continuous monitoring of the customer ETA of the customer 108 and obtaining multiple data points, inaccurate or deviating data points may be disregarded or eliminating using ETA smoothing 228 in order to arrive at the ETA determination 132.

In particular, GPS data, for instance, may indicate a current location of the customer 108 that is not entirely accurate. This may result from a poor network connection or signal associated with the customer device 110, or for different reasons. For example, the GPS data may indicate that the customer 108 is traveling on a road that the customer 108 is not currently traveling on. The road may be adjacent or parallel to the road currently being traveled by the customer 108, or may correspond to an overpass or underpass that intersected the road at which the customer 108 is or was located. Inaccurate or incorrect location data of the customer 108 may result in an inaccurate or incorrect customer ETA with respect to the merchant location. The customer ETA may be artificially increased or decreased based on the inaccurate or incorrect location data, and such inaccurate/incorrect location data points may deviate significantly from proximate location data points. For instance, a first location data point at a first time and a third data location point at a second time may indicate that the customer 108 is traveling on a highway, and a third location data point captured at a third time between the first time and the second time may indicate that the customer 108 is traveling on a different road (e.g., not the highway). This outlier location data point that may significantly deviate from proximate location data points may cause a vastly different customer ETA. For instance, the customer ETA at the first time may be 14 minutes, the customer ETA at the second time may be 13 minutes, and the customer ETA at the third time, which is based on the incorrect/inaccurate location data point, may be 22 minutes.

In certain embodiments, the ETA smoothing 228 may disregard or eliminate customer ETA data points that indicate that the customer 108 will likely not arrive at the merchant location prior to a closing time of that merchant location, when other customer ETA data points indicate that the customer 108 will in fact arrive at the merchant location prior to the closing time. The outlier customer ETA data point may be a single ETA data point, or may be multiple ETA data points collected/obtained while the customer 108 is traveling to the merchant location. In some instances, outlier customer ETA data points may be disregarded or filtered out when a threshold number of customer ETA data points associated with the customer 108 traveling to the merchant location have been obtained/calculated. The threshold number may be any number, such as five customer ETA data points, ten customer ETA data points, and so on. For example, provided that the threshold number is ten customer ETA data points collected while the customer 108 is traveling to the merchant location, assume that fifteen customer ETA data points indicate that the customer 108 will likely arrive at the merchant location prior to the closing time, and a single customer ETA data points indicates that the customer 108 will likely arrive after the closing time. These customer ETA data points may be smoothed by eliminating, disregarding, or filtering out the outlier customer ETA data point that indicates that the customer 108 will likely arrive after the closing time of the merchant location.

Using the example in the preceding paragraph, the ETA smoothing 228 may utilize one or more algorithms to filter out outlier customer ETA data points. For instance, and as discussed above, outlier customer ETA data points may be filtered out or disregarded if the customer ETA data points are equal to or greater than a threshold variation from proximate customer ETA data points. Moreover, customer ETA data points that are determined to be outliers may be maintained or considered if a sufficient amount of non-outlier customer data points have been obtained or calculated. In this embodiment, for instance, a threshold number of outlier customer ETA data points may be maintained or considered for every certain number of non-outlier customer ETA data points, such as one outlier customer ETA data points per every ten or twenty non-outlier customer ETA data points.

Regardless of how or whether outlier customer ETA data points are maintained/considered or considered/filtered out, the service provider 102 may desire to err on the side of informing customers 108 that they are likely to arrive at the merchant location prior to its closing time. That is, if the customer ETA data points collected/calculated while the customer 108 is traveling to the merchant location indicate that the customer 108 is likely to arrive prior to the closing time of the merchant location, or if the customer ETA data points indicate that the customer 108 will likely arrive right around the closing time of the merchant location, the service provider 102 may refrain from informing the customer 108 that he/she will not arrive prior to the closing time, or that there is a chance that the customer 108 may not arrive prior to the closing time. This is the case even if some, but not all, of the customer ETA data points indicate that the customer 108 may not arrive prior to the closing time of the merchant location. In some embodiments, the service provider 102 may indicate that the customer 108 likely will not arrive prior to the closing time if the customer ETA data point having the lowest amount of time (e.g., 18 minutes as opposed to 20 minutes, 22 minutes, etc.) would still cause the customer 108 to arrive at the merchant location after the closing time. If the lowest customer ETA data point indicates that the customer 108 is unlikely to arrive at the merchant location prior to the closing time, then the service provider 102 may determine with confidence that the customer 108 will not arrive prior to the closing time. For instance, if the lowest customer ETA indicates that the customer 108 will arrive at the merchant location at 5:15 pm, and the closing time of that merchant location is 5:00 pm, then the service provider 102 may determine that the customer 108 will arrive after the merchant location has closed, and the service provider 102 may send a notification to the customer 108 as a result.

Upon performing the ETA smoothing 228 on the customer ETA data points with respect to the customer 108 traveling to the merchant location, the service provider 102 may determine an ETA determination 132 with respect to the customer 108 and the merchant location. The ETA determination 132 may be calculated or received at any point during travel of the customer 108 to the merchant location, and the ETA determination 132 may represent a time that the customer 108 is expected to arrive at the merchant location. As stated above, the ETA determination 132 may be based on numerous factors, such as the physical geographic location of the merchant location, the current location of the customer 108, the route that the customer 108 is scheduled to take, current or expected traffic conditions, current or expected weather conditions, a mode of transport that the customer 108 is currently using, or is expected to use, and so on.

In some instances, the customer ETA data received by customer devices 110 is inaccurate, incomplete, or may otherwise not accurately represent the current ETA with respect to a customer 108 arriving at a merchant location. In order to generate a more accurate ETA, the service provider 102 may perform the ETA smoothing 228 described above. In addition, upon performing the ETA determination 132 for the customer 108, the service provider 102 may generate or calculate a revised/updated customer ETA for the customer 108. A more precise customer ETA may allow the service provider 102 to more accurately determine whether a customer 108 is likely to arrive at a merchant location prior to a closing time of the merchant location, at about the same time as the closing time, or after the closing time. The inability of customer devices 110 to determine or calculate accurate location data and/or customer ETAs, and the inability of the service provider 102 to receive accurate customer ETAs for customers 108, are technological problems that are solved by technological processes described herein. Without accurate location data or accurate customer ETA data, the service provider 102 will be unable to accurately determine whether the customer 108 will arrive prior to the closing time of the merchant location, which will impact whether the customer 108 will be able to pick up previously ordered items 116 from a merchant location.

The computer-readable media 120 may also store a customer-based ETA module 230, which may determine customer data 232 associated with customers 108 and calculate a customer-based ETA 234 based on the customer data 232. Calculation of the customer-based ETA 234 may constitute a technological solution to the technological problem raised above. In particular, the customer data 232 may correspond to any type of information relating to customers 108, including data identified by customers 108 in a customer profile, and/or data inferred or learned about customers 108 over time. Such customer data 232 may be based on past orders 204 for items 116 that are picked up at one or more merchant locations. For instance, the customer data 232 may include the identity of merchant locations selected or visited by customers 108, locations at which the customers 108 have indicated that they are traveling to merchant locations, routes taken by customers 108 to merchant locations, the velocity at which customers 108 have traveled, instances in which customers 108 have arrived prior to and/or after the closing time of a merchant location, and so on. Such data may be obtained or collected by a mobile application residing on a customer device 110 of the customer 108, one or more sensors of the customer device 110, or in any other manner. As a result, the customer data 232 for a customer 108 may indicate routes previously taken by the customer 108, whether the customer 108 typically arrives prior to or after a closing time, whether the customer 108 typically drives over, at, or under the speed limit, shortcuts taken by the customer 108, or any other behavior/habits exhibited by the customer 108.

As described herein, the service provider 102 may receive the customer ETA data from the customer device 110 of the customer 108, such as via a mobile application residing on the customer device 110. The service provider 102 may generate a customized or customer-centric ETA (i.e., the customer-based ETA 234) to a merchant location based on the customer data 232 for that customer 108. For instance, the customer data 232 for the customer 108 indicates that the customer 108 typically drives faster than the speed limit or frequently takes shortcuts, the service provider 102 may automatically decrease the customer ETA received from the customer device 110. Likewise, if it is determined that the customer 108 typically drives slower than the speed limit, the service provider 102 may increase the customer ETA for that customer 108. As a result, the service provider 102 may use generic customer ETA data for a customer 108 with respect to a merchant location and generate a modified customer ETA specific to that customer 108 based on the customer data 232.

In some embodiments, the customer-based ETA 234 may be determined by first generating and/or maintaining a matrix, database, table, data structure, etc. (hereinafter, "matrix"), that includes the customer data 232. In particular, the multiple types of data included within the definition of "customer data 232" may be maintained for each customer 108, and such data may include a customer identifier that uniquely identifies each customer 108. For each instance in which the customer 108 picks up items 116 at different merchant locations, the matrix may maintain an initial location of the customer 108, a geographic location of the merchant location at which the items 116 were picked up (e.g., destination location), a route taken by the customer 108, the multiple customer ETA data points during travel to the merchant location, a velocity of the customer 108 at different points during the travel, a time of arrival at the merchant location, whether the customer 108 used alternate options to obtain ordered items 116, and so on. The service provider 102 may use any type of statistical analysis to generate the customer-based ETA 234 from the data stored in the matrix.

With respect to statistical analysis, and for the purpose of this discussion, any type of machine learning model/technique and/or predictive model may be used. Examples of predictive models that may be utilized include group method of data handling, Naïve Bayes, k-nearest neighbor algorithm, majority classifier, support vector machines, random forests, boosted trees, Classification and Regression Trees (CART), neural networks, ordinary least square, regression analysis, and so on. Moreover, examples of machine learning techniques may include supervised learning, unsupervised learning, semi-supervised learning, classification analysis, regression analysis, clustering, etc. Moreover, any other types of algorithms may also be used.

Alternatively, or in addition to generating a customer-based ETA 234, a merchant store-based ETA module 236 may generate a merchant store-based ETA 238 based on the merchant store data 126. That is, the customer ETA received from the customer device 110 of the customer 108 may be modified to generate a modified customer ETA that is refined or customized based on data relating to the merchant location at which the items 116 are to be picked up by the customer 108. Since the service provider 102 may facilitate the order 204 and pick-up of items 116 from different merchant locations, the service provider 102 may maintain data relating to those particular merchant locations. For a particular merchant location, such data may include historical data representative of different customers 108 who have traveled to that merchant location. That is, the merchant store data 126 may include information regarding how and when customers 108 traveled from different locations/areas to a fixed geographic location of the merchant location. The merchant store data 126 may include initial locations from which the customers 108 traveled to the merchant location, routes taken by those customers 108, velocities at which the customers 108 traveled, times of day or days of the week in which pick-up of the items 116 occurred, weather or traffic conditions associated with the pick-up of the items 116, and any other information relating to the pick-up of items 116 from that particular merchant location.

Accordingly, over time, the service provider 102 may determine and maintain travel times from various locations to the specific geographic location of different merchant locations, as well as determine variance in travel times based on the day of the week, times of day, varying weather conditions, varying traffic conditions, and so on. As a result, the service provider 102 may maintain a robust data set relating to travel from different area/locations to each merchant location at different times of day, different days of the week, varying weather conditions, varying traffic conditions, and so on. Based on the merchant store data 126 relating to a particular merchant location, the service provider 102 may generate/calculate the merchant store-based ETA 238 based on generic customer ETA/location data 130 provided by a merchant device 110 and the merchant store data 126 for that merchant location. The service provider 102 may then calculate a customized ETA for customers 108 with respect to a merchant location based on their initial location and data representative of other customers 108 that have traveled to that merchant location around the same time, on the same day, in the same/similar weather conditions, in the same/similar traffic conditions, etc.

As an illustrative example, assume that the service provider 102 maintains merchant store data 126 regarding a specific merchant location at which a customer 108 has ordered items 116 for pick-up, and that the customer 108 is traveling from a specific area. Based on travel times from customers 108 that have previously traveled from that area to the merchant location, the service provider 102 may refine the generic ETA/location data 130 received from the customer device 110 of that customer 108 to generate a more customized ETA for that customer 108 (i.e., the merchant store-based ETA 238). The merchant store-based ETA 238 may be more accurate provided that the customer 108 is traveling to the merchant location at times/days in which other customers 108 have previously traveled to the merchant location from that same/similar area. For instance, if additional traffic is expected along the route to be taken by the customer 108, the merchant store-based ETA 238 may be higher than the generic ETA/location data 130 received by the customer device 110. As a result, the service provider 102 may use generic customer ETA/location data 130 for a customer 108 with respect to a merchant location and generate a modified, and more accurate, customer ETA specific to that merchant/store location. In various embodiments, the generic customer ETA/location data 130 received from the service provider 102 may be updated/modified using the customer data 232, the merchant store data 126, and/or a combination thereof.

In some embodiments, the merchant store data 126 may indicate additional information about a merchant location, such as the existence of a parking lot at the merchant location, a location of parking spots reserved for customers 108 that arrive at the merchant location to pick up items 116, a location of pedestrian crossings, and so on. The customer ETA received from the customer device 110 of a customer 108 may only consider a time at which the customer 108 is likely to arrive at the location of the merchant location, such as when the customer 108 turns into a parking lot of the merchant location. As a result, the generic customer ETA may not consider an amount of time it generally takes to travel through the parking lot, an amount of time to travel to a pick-up parking spot, and any additional time corresponding to an amount of time it typically takes to navigate from an entry of the merchant location to an item pick-up location at the merchant location. This data may be due to traffic in a parking lot, a distance from the entry to the pick-up location, waiting for pedestrians in the parking lot, etc. Accordingly, the service provider 102 may generate a modified/refined customer ETA based on this additional information known about the merchant location.

The computer-readable media 120 may also include a customer pick-up determination module 240 that determines the customer pick-up determination 134 for a customer 108 with respect to a merchant location that the customer 108 is scheduled to pick up items 116. Upon determining the ETA determination 132 for the customer 108, which indicates a time that the customer 108 is predicted to arrive at the merchant location, the service provider 102 may confirm whether the customer 108 will likely arrive at the merchant location during its hours of operation. That is, the service provider 102 may compare the time corresponding to the ETA determination 132 to the hours of operation of the merchant location. For instance, if the ETA determination 132 is 4:45 pm and the merchant location closes at 5:00 pm, the service provider 102 may determine that the customer 108 will in fact arrive prior to the closing time of the merchant location and, therefore, the customer 108 may pick up the previously ordered items 116.

In some embodiments, the service provider 102 may add a threshold amount of time to the closing time of the merchant location. For instance, even though the merchant location closes at 5:00 pm, the service provider 102 may add a threshold amount of time (e.g., five minutes) to the closing time. As a result, if the ETA determination 132 indicates that the customer 108 is likely to arrive prior to the closing time plus the threshold amount of time, then the service provider 102 may determine that the customer 108 will still likely be allowed to pick up the items 116 from the merchant location. As an illustrative example, provided that the ETA determination 132 indicates that the customer 108 is likely to arrive at the merchant location at 5:03 pm, that the closing time of that merchant location is 5:00 pm, and that the threshold amount of time is five minutes (5:05 pm) or ten minutes (5:10 pm), the customer 108 may nevertheless be allowed to pick up the items 116. That is, the service provider 102 may refrain from sending a notification to the customer 108 indicating that the customer 108 may be unable to pick up his/her items 116. Accordingly, the service provider 102 and/or the merchant location may allow customers 108 to arrive a short amount of time after the closing time of merchant locations, and may want to avoid turning customers 108 away that arrive a short amount of time after closing. If the customer 108 arrives at the merchant location within that threshold amount of time, then the service provider 102 may not consider the customer 108 to be late when picking up items 116.

In some embodiments, the threshold amount of time described in the preceding paragraph may be relative to a closing time of a merchant location and may be specific to that particular merchant location. More particularly, the service provider 102 may determine a predetermined time associated with the merchant location. After that predetermined time, customers 108 are no longer authorized or allowed to pick up items 116 at the merchant location. The predetermined time may correspond to the closing time of that merchant location. However, the predetermined time may also consider the threshold amount of time that is either prior to or after the closing time of the merchant location. For instance, the predetermined time may be a threshold amount of time (e.g., five minutes) prior to the closing time of the merchant location (e.g., 5:00 pm), resulting in a predetermined time of 4:55 pm. On the other hand, the predetermined time may be a threshold amount of time (e.g., five minutes) after the closing time of the merchant location (e.g., 5:00 pm), resulting in a predetermined time of 5:05 pm. The predetermined time and/or threshold amount of time may vary based on the merchant location, the time of day, the area in which the merchant location is located, and so on.

As stated herein, the customer ETA of the customer 108 with respect to a merchant location may vary as the customer 108 is traveling to the merchant location. For instance, when the customer 108 initially indicates that he/she is beginning to travel to the merchant location, the customer ETA may be 18 minutes. However, as the customer 108 travels closer to the merchant location, the customer ETA may vary from 18 minutes, to 15 minutes, to 16 minutes, to 13 minutes, etc., as the customer 108 travels closer to the merchant location. That is, the customer ETA may be continuously updated/calculated based on the route taken by the customer 108, traffic conditions, weather conditions, stopping at traffic lights, construction along the route taken by the customer 108, and so on.

The customer pick-up determination module 240 may determine or generate the customer pick-up determination 134, which is a determination as to whether the customer 108 is likely to arrive at the merchant location prior to a closing time of the merchant location, or within a threshold amount of time of the merchant location (e.g., 5 minutes, 10 minutes, etc.). In some instances, however, the ETA determination 132 of the customer 108 may be very close to either the closing time of the merchant location or the threshold amount of time past the closing time. Any variance in the customer ETA may be greater when the customer 108 is further from the merchant location. A determination of whether the customer 108 is likely to arrive after the closing time of the merchant location (or possibly plus a threshold amount of time) may be based on a sliding scale that is dependent on the distance between the current location of the customer 108 and the merchant location or the customer ETA to the merchant location. For example, if the customer 108 is approximately an hour from the merchant location, and the customer ETA indicates that the customer 108 will arrive at the merchant location two minutes after closing, the service provider 102 may refrain from notifying the customer 108 that he/she will be late. This is because the customer ETA may vary significantly when the customer 108 is that far away from the merchant location and, even though the customer ETA indicates that the customer 108 will arrive slightly after the closing time, the customer 108 may very well arrive prior to the closing time. A threshold amount of time may be 15-20 minutes in this scenario. However, if the customer 108 is instead likely to be 20-30 minutes late (e.g., greater than the threshold amount of time), it is very unlikely that the customer 108 will arrive prior to closing time and the service provider 102 may send a notification indicating that the customer 108 will likely arrive after the merchant location has closed.

The threshold amount of time described in the preceding paragraph may decrease over time as the customer 108 travels closer to the merchant location. As stated above, the threshold amount of time when the customer 108 is approximately an hour from the merchant location may be 15-20 minutes. However, the service provider 102 may set the threshold amount of time at 5-10 minutes when the customer 108 is approximately 30 minutes from the merchant location. If the customer 108 is approximately 30 minutes from the merchant location and the customer ETA indicates that the customer 108 will arrive about 10 minutes after the closing time of the merchant location, the service provider 102 may determine that the customer 108 is unlikely to arrive at the merchant location during its hours of operation. As described in additional detail herein, the service provider 102 may notify the customer 108 that he/she is unlikely to arrive at the merchant location prior to the closing time (or prior to the closing time plus the additional threshold amount of time). The threshold amount of time may continue to decrease as the customer 108 continues to travel towards the merchant location. For example, the threshold amount of time may decrease to 3-5 minutes when the customer 108 is approximately 10-15 minutes from the merchant location. In some embodiments, the service provider 102 may assign confidence values as to whether each customer ETA indicates that the customer 108 will arrive after the closing time or not.

The threshold amount of time described in the preceding paragraphs may also be route specific, as the customer ETAs for certain routes may be more accurate than others. For instance, historical data maintained by the service provider 102 may indicate that the customer ETAs for customers 108 traveling along a particular route (e.g., a highway in a more rural area) may be more accurate that customer ETAs associated with different routes (e.g., a street in an urban downtown area). One or more machine learning techniques may be utilized to determine the relative accuracy of different routes to different merchant locations, where the customer ETAs of customers 108 who previously traveled to pick up items 116 from merchant locations may serve as a training data set. That is, using one or more machine learning techniques or algorithms, the service provider 102 may learn which ETAs are more accurate than other with respect to different routes to a merchant location. One or more predictive models may further be used to determine customer ETAs for a customer 108 currently traveling to a merchant location.

Based on the historical data, such as historical data relating to previous traffic conditions in different areas and/or the accuracy of previously determined customer ETAs for customer 108, the service provider 102 may predict customer ETAs from different locations/areas to different merchant locations. For instance, with respect to an initial location of the customer 108 and a specific merchant location at which the customer 108 is to pick up one or more items 116, the service provider 102 may determine the shortest travel time and the longest travel time at different times of day. The service provider 102 may determine that, based on the historical data, the shortest travel time may be at 2:00 am when there is little, if any, traffic (e.g., 15 minutes), and that the longest travel time may be during rush hour when roads are much more congested, such as between 7:00-9:00 am or 4:00-6:00 pm (e.g., 35 minutes). Based on the time in which the customer 108 will be traveling to the merchant location, the service provider 102 may estimate the likely travel time and corresponding customer ETA. In some embodiments, the service provider 102 may consider the shortest travel time when determining the customer ETA and conservatively determine whether the customer 108 will arrive at the merchant location prior to the closing time. In some instances, the service provider 102 may notify the customer 108 of the best possible customer ETA, and the customer 108 may consider this information to determine whether he/she will attempt to travel to the merchant location prior to the closing time.

Based on the customer pick-up determination 134 of whether a customer 108 is likely to arrive at a merchant location prior to its closing time (or the closing time plus the additional threshold amount of time), the customer pick-up determination module 240 may determine one or more item fulfillment options 242. More particularly, the service provider 102 may determine that the customer 108 will not, or is unlikely to, arrive at the merchant location during its hours of operation. Therefore, the customer 108 will be unable to pick up his/her ordered items 116 at that time. The service provider 102 may identify one or more item fulfillment options 242 that may allow the customer 108 to obtain the ordered items 116 in a different manner. The item fulfillment option(s) 242 may be presented to the customer 108 at various times and in different manners. For instance, the item fulfillment option(s) 242 may be presented to the customer 108 when the customer 108 selects a merchant location prior to placing the order 204 (via the website or mobile application), when the customer 108 places the order 204, or at any time when the customer 108 is traveling to the merchant location. When the service provider 102 determines, based on the ETA determination 132, that the customer 108 will not arrive prior to the closing time of the merchant location, the service provider 102 may indicate that to the customer 108 (e.g., "your ETA indicates that you will arrive after the merchant location closes") and may present the one or more item fulfillment options 242. The notification indicating that the customer 108 will be unable to pick up his/her items 116 and/or the item fulfillment options 242 may be presented via the mobile application or website associated with the service provider 102, a text message, an e-mail message, a chat message, and so on.

Some or all of the potential item fulfillment options 242 may be presented to the customer 108, and may allow the customer 108 to still obtain his/her ordered items 116 even though the customer 108 has arrived, or will arrive, at the merchant location after the merchant location has closed, or will close. One item fulfillment option 242 may be to offer an option for the customer 108 to pick up the ordered items 116 at a different merchant location that is possibly associated with the service provider 102 or the same merchant 104 as the initial merchant location. As will be described in additional detail herein, the alternative pick-up option may be based on one or more factors, such as whether there are other merchant locations associated with the service provider 102/merchant 104, an availability of those alternative merchant locations, an inventory of items 116 of those alternative merchant locations (e.g., whether the ordered items 116 are available at those alternative merchant locations), whether a customer ETA with respect to the customer 108 and those alternative merchant locations indicates that the customer 108 would arrive during the hours of operation of those alternative merchant locations, and so on.

Alternatively, or in addition to offering alternative merchant locations to pick up the ordered items 116, the item fulfillment options 242 may include offering to deliver the ordered items 116. That is, instead of allowing the customer 108 to pick up the ordered items 116 from the merchant location, the service provider 102 may offer to deliver the ordered items 116 to a location associated with the customer 108, such as a residence, a workplace, or some other location provided by the customer 108 or specified in a customer profile/account of the customer 108. Switching from pick-up to delivery may also be accompanied with a fee to be incurred by the customer 108. In some embodiments, in addition to offering a delivery of the ordered items 116, the service provider 102 may identify one or more time slots/periods in which the ordered items 116 may be delivered. The customer 108 may then select, via the mobile application or website, one of the time slots/periods. Provided that the ordered items 116 had already been assembled for pick-up at the merchant location, the assembled order 204 may be repackaged for delivery. In some instances, the service provider 102 may send an instruction for the merchant location to assemble the order 204 or repackage the order 204 for delivery and provide information (e.g., customer identity, delivery location, delivery time slot/period, etc.) that allows an individual at the merchant location to deliver the ordered items 116. If the items 116 had not yet been assembled for delivery at the merchant location, the service provider 102 may instruct the merchant location to package the ordered items 116 for delivery. The ordered items 116 may be delivered by an individual at the merchant location or by a different individual that picks up the ordered items 116 from the merchant location and transports the ordered items 116 to the delivery location of the customer 108.

The item fulfillment option(s) 242 may also include offering to reschedule pick-up 148 of the ordered items 116 at the same merchant location. In this embodiment, the service provider 102 may identify one or more subsequent time slots/periods in which the customer 108 is able to pick up the ordered items 116 from the merchant location. Provided that the customer 108 selects one of the subsequent pick-up time slots/periods, the service provider 102 may convey that information to the merchant location. If the ordered items 116 have already been assembled or packaged at the merchant location, the service provider 102 may instruct the merchant location to restock or restage the items 116 at the merchant location, such as by placing the items 116 back on shelving, in a refrigerator or refrigerated area, in a freezer or a frozen area, and so on. If the ordered items 116 have not been assembled for pick-up, the service provider 102 may instruct the merchant location to assemble the ordered items 116 for the selected subsequent time slot/period.

In other embodiments, the item fulfillment option(s) 242 may allow the customer 108 to cancel the order 204, and the service provider 102 may possibly offer a full or partial refund for an amount paid by the customer 108. If the ordered items 116 have already been assembled or packaged at the merchant location, the service provider 102 may instruct the merchant location to restock or restage the items 116 at the merchant location, such as by placing the items 116 back on shelving, in a refrigerator or refrigerated area, in a freezer or a frozen area, and so on. If the ordered items 116 have not been assembled for pick-up, the service provider 102 may instruct the merchant location to forgo assembling the order 204 for pick-up.

Accordingly, upon determining that the customer 108 will not be able to pick up his/her items 116 prior to the merchant location closing, the service provider 102 may perform one or more of several options. For instance, the service provider 102 may instruct one or more individuals at the merchant location to not assemble the ordered items 116 for pick-up, to restock/restage the ordered items 116 if they have already been assembled for pick-up, to assemble or repackage the ordered items 116 for delivery, and/or to assemble or repackage the ordered items 116 for a later pick-up at the merchant location. The service provider 102 may also instruct an individual or associate to pick up the ordered items 116 for delivery. In other embodiments, the service provider 102 may instruct individuals at an alternative merchant location to assemble/package some or all of the ordered items 116 for pick-up from that alternative merchant location.

The service provider 102 may send different notifications to customers 108 at different times, and the extent and substance of the notifications may be customized for the customer 108. For instance, either when the customer 108 selects a merchant location for pick-up or when the customer 108 places the order 204, the service provider 102 may notify the customer 108 of the customer ETA and/or an indication of whether the customer 108 is likely to arrive at the merchant location prior to a closing time of the merchant location. As stated above, the notifications may be sent via the mobile application or website associated with the service provider 102, a text message, an e-mail message, a chat message, and so on. The notification may indicate that customer 108 may possibly arrive at the merchant location prior to the closing time, but the customer ETA for the customer 108 indicates that the customer 108 likely will not arrive prior to the closing time. A different type of notification may inform the customer 108 that he/she will arrive subsequent to the closing time of the merchant location.

The frequency of the notifications to customers 108 may also vary. For instance, notifications to the customer 108 may be infrequent due to safety reasons since the customer 108 may be driving to the merchant location. In some embodiments, once the customer 108 selects the "on my way" button, the service provider 102 may send or present (via the mobile application/website) a notification indicating the customer ETA and/or an indication that the customer 108 likely will or will not arrive prior to the closing time. The service provider 102 may send/present this notification since the customer 108 is likely viewing his/her customer device 110. Once the customer 108 begins traveling to the merchant location, the service provider 102 may keep notifications to a minimum. For instance, the service provider 102 may only send/present notifications if the customer 108 is likely to arrive at the merchant location after the closing time. In some instances, the silent notifications may be sent/presented in order to avoid distracting a driver. In other embodiments, the service provider 102 may determine a velocity of the customer device 110 and only send notifications if the velocity data indicates that the customer 108 is not currently driving (e.g. the customer device 110 is traveling less than a threshold velocity, such as five miles per hour).

FIGS. 3-7 illustrate example processes of determining an ETA of a customer with respect to the pick-up of items at a merchant location and identifying alternative options for fulfilling an order for the items. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Figure 3:
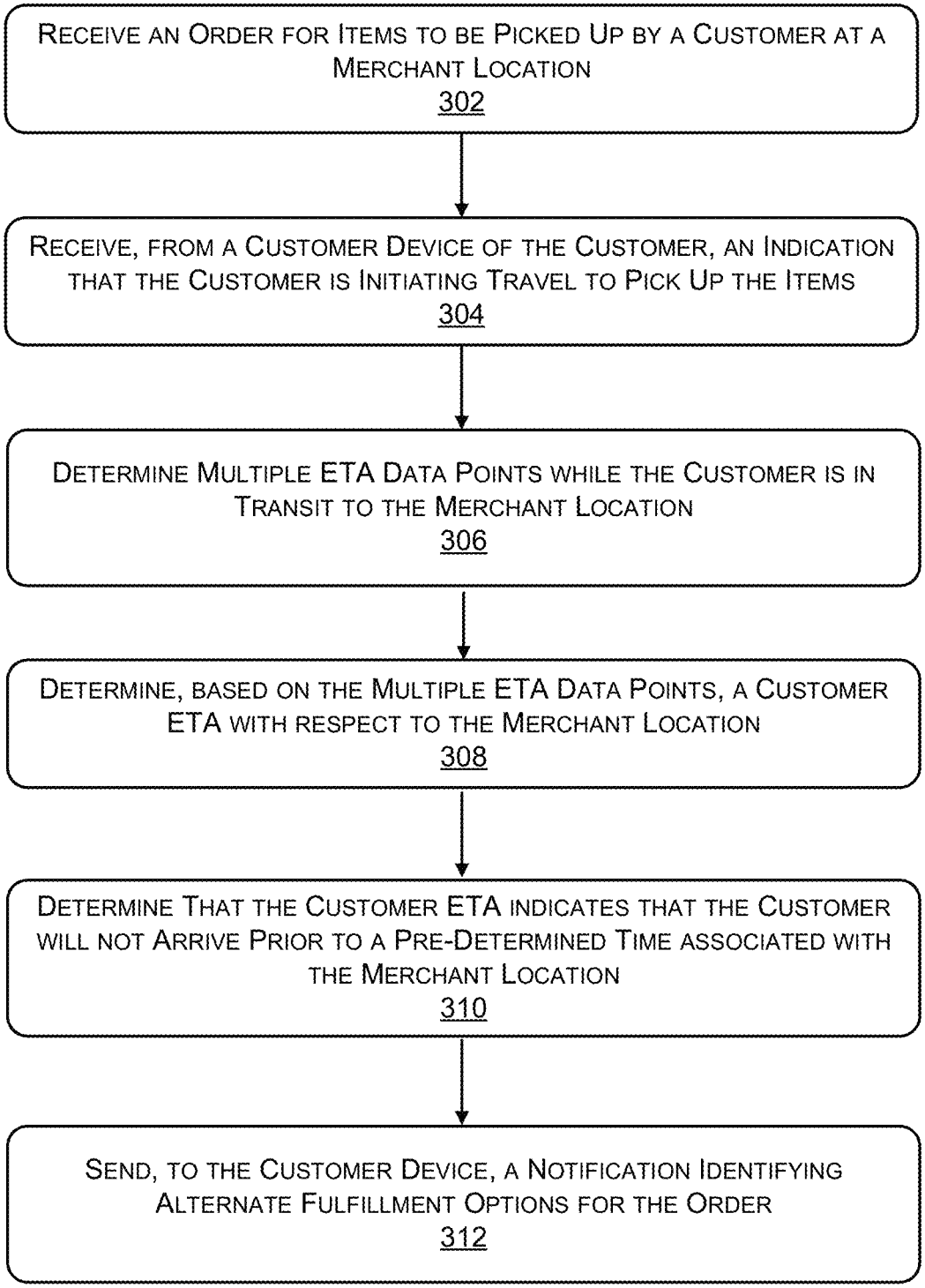
FIG. 3 is a flow diagram illustrating an example process of determining an ETA of a customer with respect to the pick-up of items at a merchant location and identifying alternative options for fulfilling an order for the items.

FIG. 3 illustrates a flow diagram of an example process 300 of determining an ETA of a customer with respect to the pick-up of items at a merchant location and identifying alternative options for fulfilling an order for the items. Moreover, the following actions described with respect to FIG. 3 may be performed by the service provider 102 and/or the content server(s) 114, as illustrated with respect to FIGS. 1 and 2.

Block 302 illustrates receiving an order for items to be picked up by a customer at a merchant location. In particular, the customer 108 may place an order for items 116 via a mobile application or website associated with the service provider 102, where the ordered items 116 are to be picked up at a merchant location of a merchant 104, such a physical grocery store of a grocery store chain. In some embodiments, the merchant location may be associated with the service provider 102.

Block 304 illustrates receiving, from a customer device of the customer, an indication that the customer is initiating travel to pick up the items. Either while placing the order 204 or afterwards, the customer 108 may indicate that he/she is beginning to travel to the merchant location. For instance, the customer 108 may select a button or a selectable user interface element via the mobile application/website of the service provider 102 (e.g., an "on my way" button), which may indicate to the service provider 102 that the customer 108 is now traveling to the merchant location.

Block 306 illustrates determining multiple ETA data points while the customer is in transit to the merchant location. In some embodiments, the customer device 110 of the customer 108 may determine and send, at different times, multiple ETA data points indicating an ETA of the customer 108 with respect to the merchant location while the customer 108 is traveling to the merchant location. The ETA data points may be calculated by one or more sensors and/or mobile applications associated with the customer device 110. In alternate embodiments, the customer device 110 may send, to the content server(s) 114, raw location data 218 that indicates a current location of the customer device 110 at different times while the customer 108 is traveling to the merchant location. Based on various data (e.g., current location of the customer 108, physical location of the geographic location, a route taken by the customer 108, traffic conditions, weather conditions, etc.), the service provider 102 may calculate the customer ETA of the customer 108 with respect to the merchant location at different times while the customer 108 is traveling to the merchant location.

Block 308 illustrates determining, based on the multiple ETA data points, a customer ETA with respect to the merchant location. After possibly smoothing the multiple ETA data points (e.g., ETA smoothing 228), the service provider 102 may determine a customer ETA of the customer 108. In some embodiments, the customer ETA may be a refined and more accurate ETA, as compared to the generic ETA received from the customer device 110, based on customer data 232 associated with the customer 110 (e.g., the customer-based ETA 234) and/or the merchant store data 126 associated with the merchant location (e.g., the merchant store-based ETA 238).

Block 310 illustrates determining that the customer ETA indicates that the customer will not arrive at the merchant location prior to a predetermined time associated with the merchant location. In particular, the service provider 102 may confirm that the customer 108 likely will, or likely will not, arrive at the merchant location after the closing time of the merchant location, after the closing time plus an additional amount of time (e.g., 5-10 minutes), or an amount of time prior to the closing time. As a result, the predetermined time may correspond to a time prior to the closing time of the merchant location, the particular closing time of the merchant location, or a time subsequent to the closing time of the merchant location. The predetermined time may correspond to a time at which customers 108 are no longer authorized or allowed to pick up items 116 at the merchant location.

Block 312 illustrates sending, to the customer device, a notification identifying alternate fulfillment options for the order. For instance, via the mobile application or the website associated with the service provider 102 (or via an e-mail message, text message, chat message, telephone call, etc.), the service provider may send/present a notification that indicates that the customer 108 likely will not arrive at the merchant location in time to pick up his/her ordered items 116. Optionally, the service provider 102 may present alternate item fulfillment options 242 for the customer 108 to obtain the items 116. Such item fulfillment options 242 may include allowing the customer 108 to pick up the items 116 at an alternative merchant location, facilitating a delivery of the ordered items 116, allowing the customer 108 to pick up the ordered items 116 from the merchant location at a subsequent time period/slot, and/or allowing the customer 108 to cancel the order 204 (possibly with a full or partial refund).

Figure 4:
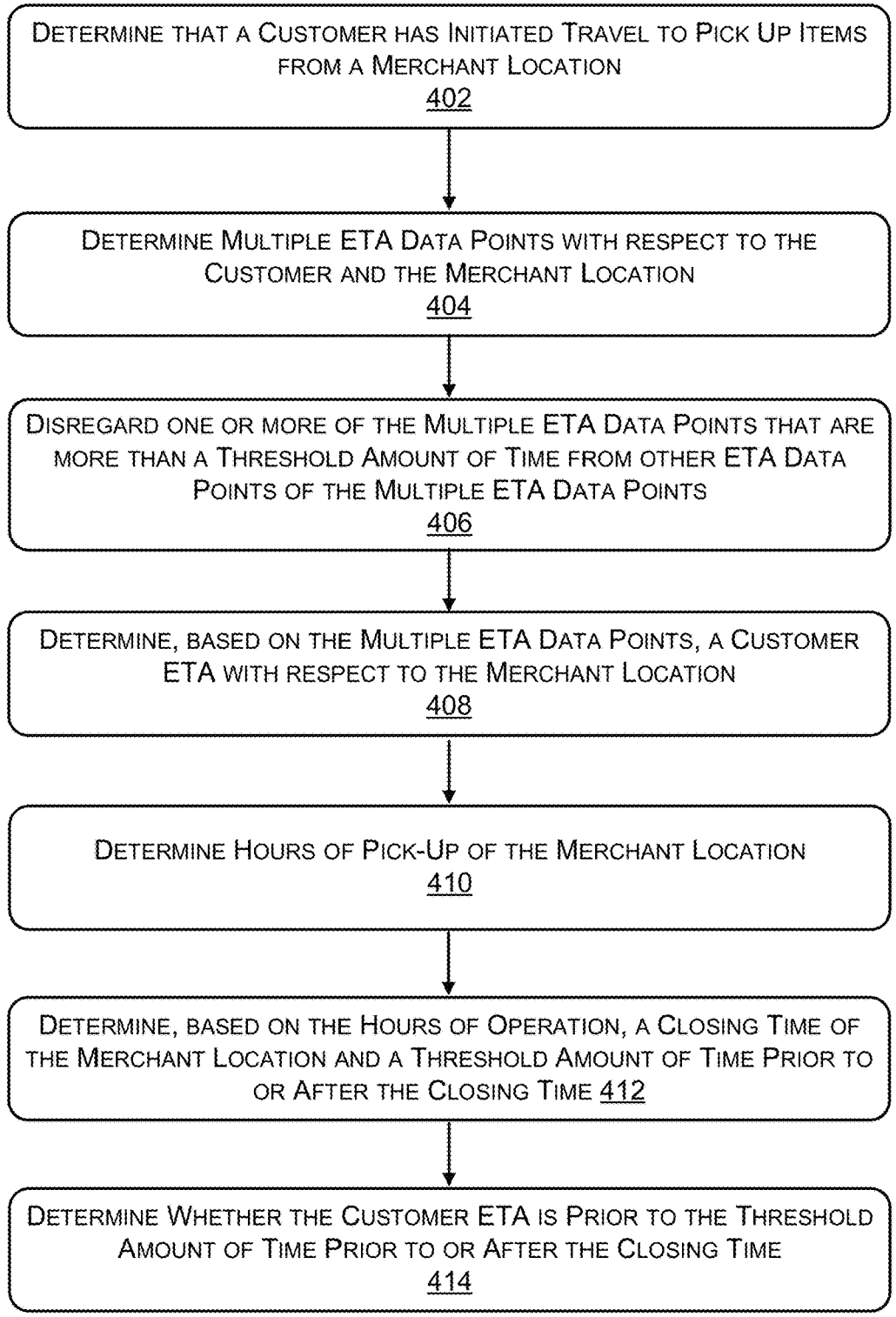
FIG. 4 is a flow diagram illustrating an example process of determining whether an ETA of a customer with respect to the pick-up of items at a merchant location is likely to occur during the hours of operation of the merchant.

FIG. 4 illustrates a flow diagram of an example process 400 of determining whether a customer is likely to arrive at a merchant location outside of the hours of operation of the merchant location. Moreover, the following actions described with respect to FIG. 4 may be performed by the service provider 102 and/or the content server(s) 114, as illustrated with respect to FIGS. 1 and 2.

Block 402 illustrates determining that a customer has initiated travel to pick up items from a merchant location. For instance, the customer 108 may select an "on my way" button via the mobile application or website associated with the service provider 102.

Block 404 illustrates determining multiple ETA data points with respect to the customer and the merchant location. The multiple ETA data points may correspond to an estimated time that the customer 108 is likely to arrive at the merchant location at different times when the customer 108 is traveling to the merchant location. In some embodiments, the multiple ETA data points may be determined by, and received from, the customer device 110 of the customer 108. In other embodiments, the service provider 102 may receive raw location data 218 from the customer device 110 and then calculate the multiple ETA data points from the raw location data 218.

Block 406 illustrates disregarding one or more of the multiple ETA data points that are more than a threshold amount of time from other ETA data points of the multiple ETA data points. The disregarded ETA data point(s) may be ETA data points that are considered to be outliers in view of proximate ETA data points, and disregarding of the ETA data point(s) may be performed by ETA smoothing 228.

Block 408 illustrates determining, based on the multiple ETA data points, a customer ETA with respect to the merchant location. Based on the ETA data points with respect to the customer 108 and the merchant location while the customer 108 is traveling to the merchant location, the service provider 102 may calculate a final customer ETA for the customer 108.

Block 410 illustrates determining hours of pick-up of the merchant location. For instance, the hours of pick-up may correspond to times in which the merchant location is available or open (and/or is not available or closed) for the pick-up of items 116 ordered by customers 108. The service provider 102 may maintain the hours of pick-up data if the merchant location is associated with (or operated by) the service provider 102. Otherwise, the hours of pick-up of the merchant location may be sent or made available by an associated merchant 104.

Block 412 illustrates determining, based on the hours of operation, a closing time of the merchant location and a threshold amount of time prior to or after the closing time. The service provider 102 may compare the customer ETA of the customer 108 to the hours of pick-up of the merchant location to determine whether the customer 108 is likely to arrive after a time at which customers 108 are no longer authorized or allowed to pick up items 116 at the merchant location. This predetermined time may be an amount of time prior to the closing time, the closing time itself, or an amount of time after the closing time (e.g., 5-10 minutes).

Block 414 illustrates determining whether the customer ETA is prior to the threshold amount of time prior to or after the closing time. If the customer ETA is after the closing time of the merchant location (or after the closing time plus an additional amount of time), the service provider 102 may indicate that to the customer 108 and possibly present the one or more alternate item fulfillment options 242.

Figure 5:
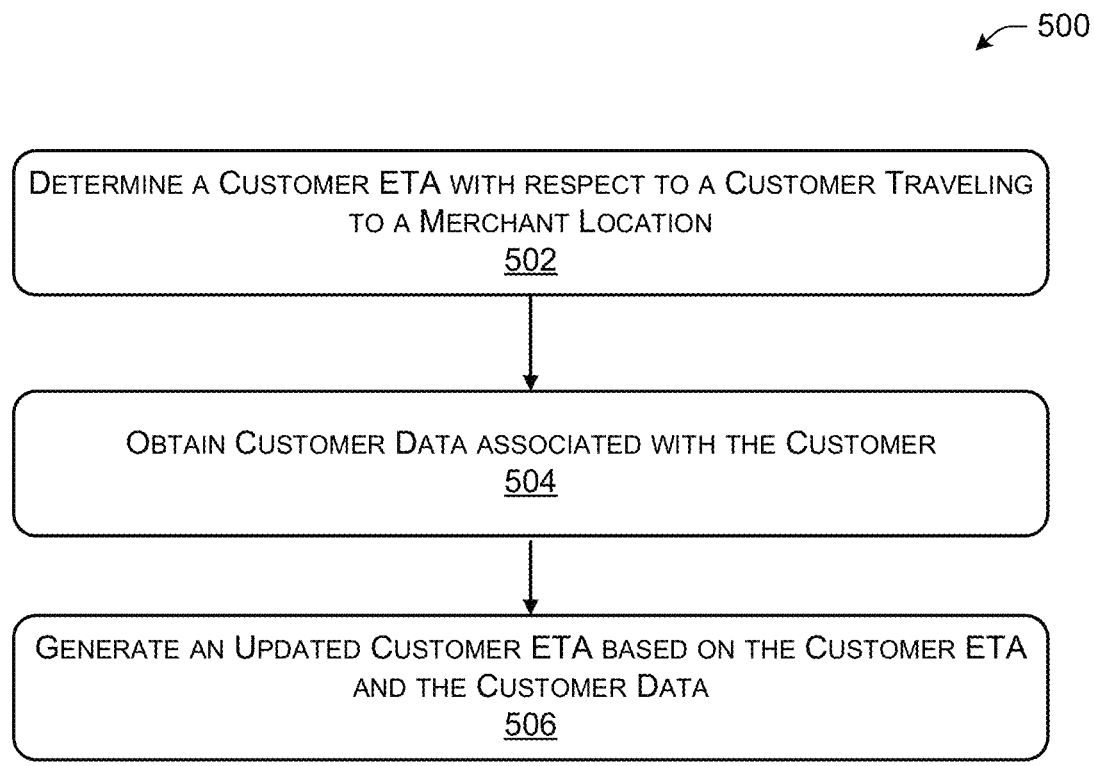
FIG. 5 is a flow diagram illustrating an example process of generating a modified ETA of a customer with respect to a merchant location based on customer data associated with the customer.

FIG. 5 illustrates a flow diagram of an example process 500 of determining a modified customer ETA based on customer data associated with a customer. Moreover, the following actions described with respect to FIG. 5 may be performed by the service provider 102 and/or the content server(s) 114, as illustrated with respect to FIGS. 1 and 2.

Block 502 illustrates determining a customer ETA with respect to a customer traveling to a merchant location. In some embodiments, a generic customer ETA may be provided to the service provider 102 by a customer device 110 of the customer 108. The generic customer ETA may indicate a likely time of arrival with respect to the customer 108 traveling to the merchant location to pick up one or more ordered items 116.

Block 504 illustrates obtaining customer data associated with the customer. The customer data 232 may indicate information associated with previous instances in which the customer 108 picked up items 116 from various merchant locations, as described in additional detail herein.

Block 506 illustrates generating an updated customer ETA based on the customer ETA and the customer data. Based on the customer data 232, the service provider 102 may generate a customized, refined, and more accurate customer-based ETA 234 with respect to the customer 108 traveling to the merchant location.

Figure 6:
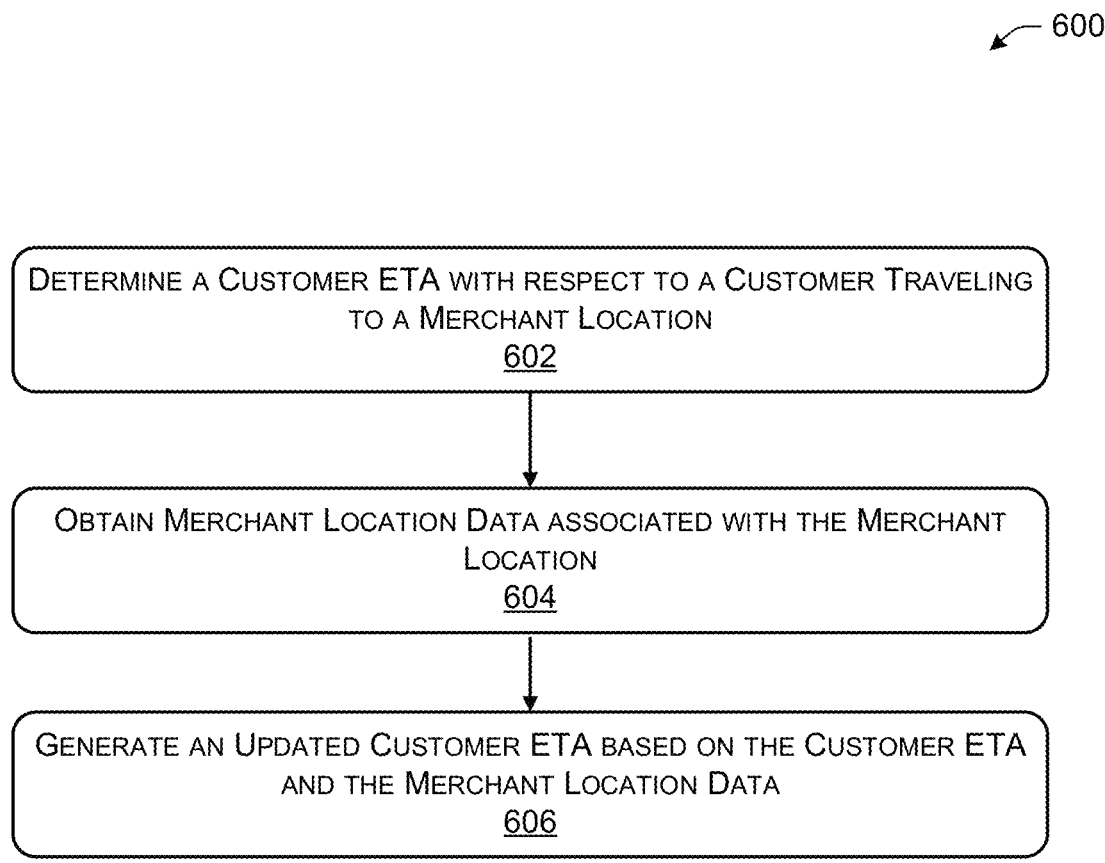
FIG. 6 is a flow diagram illustrating an example process of generating a modified ETA of a customer with respect to a merchant location based on merchant location data associated with the merchant.

FIG. 6 illustrates a flow diagram of an example process 600 of determining a modified customer ETA based on merchant store data associated with a merchant location. Moreover, the following actions described with respect to FIG. 6 may be performed by the service provider 102 and/or the content server(s) 114, as illustrated with respect to FIGS. 1 and 2.

Block 602 illustrates determining a customer ETA with respect to a customer traveling to a merchant location. In some embodiments, a generic customer ETA may be provided to the service provider 102 by a customer device 110 of the customer 108. The generic customer ETA may indicate a likely time of arrival with respect to the customer 108 traveling to the merchant location to pick up one or more ordered items 116.

Block 604 illustrates obtaining merchant location data associated with the merchant location. The merchant location data (e.g., the merchant store data 126) may indicate information associated with previous instances in which customers 108 traveled to the merchant location from different areas/locations, as described in additional detail herein.

Block 606 illustrates generating an updated customer ETA based on the customer ETA and the merchant location data. Based on the merchant location data, the service provider 102 may generate a customized, refined, and more accurate merchant location-based ETA 238 with respect to the customer 108 traveling to the merchant location.

Figure 7:
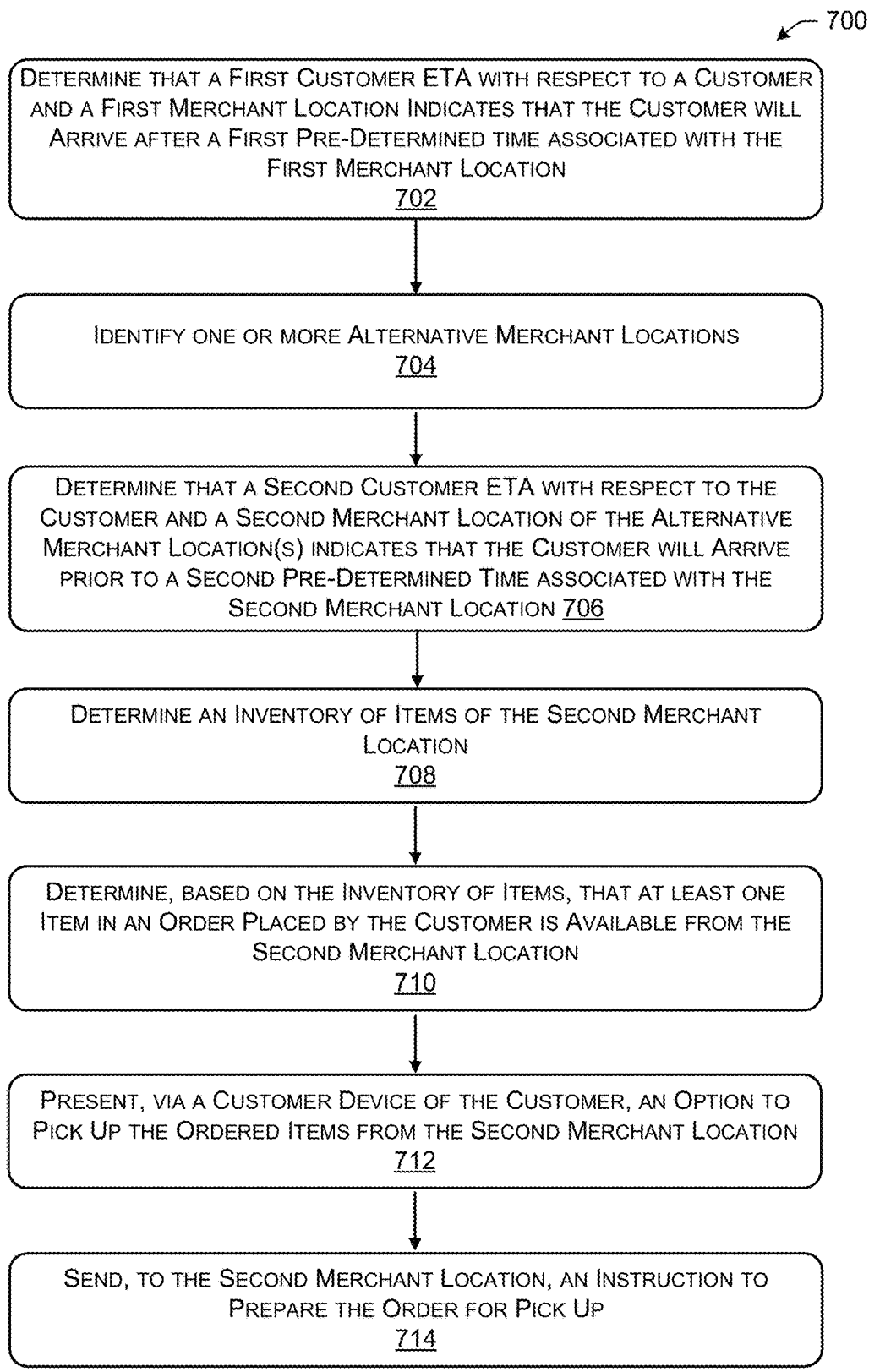
FIG. 7 is a flow diagram illustrating an example process of facilitating the pick-up of items ordered by a customer from an alternate merchant location.

FIG. 7 illustrates a flow diagram of an example process 700 of facilitating the pick-up of items by a customer at an alternative merchant location. Moreover, the following actions described with respect to FIG. 7 may be performed by the service provider 102 and/or the content server(s) 114, as illustrated with respect to FIGS. 1 and 2.

Block 702 illustrates determining that a first customer ETA with respect to a customer and a first merchant location indicates that the customer will arrive after a predetermined time associated with the first merchant location. In some embodiments, a customer 108 may have selected a first merchant location to pick up one or more ordered items 116, and the service provider 102 may determine that, based on a customer ETA of the customer 108, the customer 108 is unlikely to arrive at the first merchant location prior to a time at which customers 108 are no longer authorized or allowed to pick up items 116 at the first merchant location. The predetermined time may be the closing time of the merchant location, or an amount of time prior to or after the closing time. As a result, the customer 108 will be unable to pick up the ordered items 116 if he/she arrives after the predetermined time.

Block 704 illustrates identifying one or more alternative merchant locations. Upon determining that the customer 108 is unlikely to arrive at the first merchant location while it is still open, the service provider 102 may present one or more alternative fulfillment options 242 for obtaining the ordered items 116. Such options may include picking up the items 116 from an alternate merchant location, facilitating a delivery of the ordered items 116, scheduling the items 116 to be picked up from the first merchant location at a subsequent time period/slot, or even allowing the customer 108 to cancel the order 204.

In some instances, the customer 108 may elect to pick up the items 116 from an alternative merchant location. Provided that the first merchant location is associated with or operated by the service provider 102, the service provider 102 may identify other merchant locations that may be able to fulfill the pick-up order 204 for the customer 108. If the first merchant location is associated with or operated by a third-party merchant 104, the service provider 102 may identify other merchant locations of that merchant 104 that may be able to facilitate a pick-up of the ordered items 116. In either embodiment, the service provider 102 may identify one or more alternative merchant locations that could potentially fulfill the pick-up order 204 for the customer 108. The alternative merchant locations that could potentially offer at least some of the ordered items 116 for pick-up may be identified in various manners. For instance, the service provider 102 may identify alternative merchant locations within a certain distance (e.g., miles) from the current location of the customer 116 or a different location associated with the customer 108 (e.g., a residence, a workplace, a previous location, a future anticipated location, etc.). Moreover, the potential alternative merchant locations may be selected based on being a predetermined distance from the merchant location at which the customer 108 was initially intending to pick up his/her items 116.

Block 706 illustrates determining that a second customer ETA with respect to the customer and a second merchant location of the alternative merchant location(s) indicates that the customer will arrive prior to a second predetermined time associated with the second merchant location. Provided that the service provider 102 identifies one or more alternative merchant locations that could potentially fulfill the pick-up order 204 for the customer 108, the service provider 102 may determine the hours of operation/pick-up of the alternative merchant location(s). The service provider 102 may then determine a customer ETA of the customer 108 with respect to one or more of the alternative merchant locations. The customer ETA(s) may be received from the customer device 110 of the customer 108 or calculated by the service provider 102 based on location data 218 received from the customer device 110. Based on the hours of operation/pick-up of the alternative merchant location(s), the service provider 102 may determine whether the customer 108 is likely to arrive at the alternative merchant location(s) prior to a closing time (or a closing time plus or minus an additional amount of time) of the alternative merchant location(s). In one embodiment, the service provider 102 may determine that the customer 108 is likely to arrive at a second merchant location of the alternative merchant locations prior to its closing time, or prior to a time at which customers 108 are no longer authorized/allowed to pick up items 116. The second merchant location may be identified by the service provider 102 and/or selected by the customer 108 (via the mobile application or website). For instance, the service provider 102 may present, to the customer 108, one or more nearby alternative merchant locations that could facilitate the pick-up of the items 116 ordered by the customer 108 and allow the customer 108 to select one of the alternative merchant locations.

Block 708 illustrates determining an inventory of items of the second merchant location. More particularly, the service provider 102 may determine which items 116 are currently in stock at the second merchant location, such as via a point-of-sale system that maintains an inventory of available items 116 at the second merchant location and that is accessible by the service provider 102. The service provider 102 may access the inventory of items 116 of the second merchant location to determine if the items 116 ordered by the customer 108 are currently located at the second merchant location.

Block 710 illustrates determining, based on the inventory of items, that at least one item in an order placed by the customer is available from the second merchant location. In some embodiments, the service provider 102 may determine that the items 116 ordered by the customer 108 are not available at the second merchant location. In that scenario, the customer 108 will be unable to pick up the ordered items 116 from the second merchant location. However, in other embodiments, the service provider 102 may determine that at least some of the ordered items 116 are available for pick-up at the second merchant location. The service provider 102 may present, to the customer 108, the items 116 in the customer's order 204 that are available for pick-up from the second merchant location. If one or more of the ordered items 116 are not currently available at the second merchant location, the service provider 102 may indicate this to the customer 108. In some instances, the customer 108 may identify alternative items 116 that could serve as substitutes for those non-available items 116. The customer 108 may then indicate, via the mobile application/website, whether he/she would like to pick up the alternative items 116 in lieu of the non-available items 116 that were included in the order 204 placed by the customer 108.

Block 712 illustrates presenting, via a customer device of the customer, an option to pick up the ordered items from the second merchant location. Upon determining that at least one item 116 ordered by the customer 108 is available for pick-up from the second merchant location, the service provider 102 may allow the customer 108 to indicate that he/she would like pick up those items 116 from the second merchant location. The customer 108 could make such a selection via the mobile application or website that the customer 108 used to place the order 204.

Block 714 illustrates sending, to the second merchant location, an instruction to prepare the order for pick up. Upon receiving the selection from the customer 108, the service provider 102 may send instructions to a merchant device 106 at the second merchant location, where the instructions identify the items 116 that are to be picked up by the customer 108. The instructions may also instruct one or more individuals at the second merchant location to assemble the items 116 for pick-up, as well as identify when the customer 108 is expected to pick up the items 116.

In some embodiments, additional time may be needed by the second merchant location to assemble the items 116 for pick-up. For instance, facilitating the items 116 for pick-up may include an amount of time to obtain and package the items 116 for pick-up (e.g., 30 minutes). If the customer ETA of the customer 108 for that second merchant location was less than the amount of time (e.g., 20 minutes), the customer 108 may have to wait to pick up the ordered items 116.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    one or more processors;
    memory; and
    one or more computer-executable instructions stored in the memory and executable by the one or more processors to perform operations comprising:
        receiving, via a mobile application that resides on a device of a customer and that is associated with a service provider, an order for one or more food items, the order identifying a physical store location at which the customer is to pick up the one or more food items;
        receiving, via the mobile application, a selection of a selectable element that indicates that the customer is initiating travel to the physical store location to pick up the one or more food items;
        receiving, from the device and while the customer is in transit to the physical store location, multiple estimated time of arrival (ETA) data points, each of the multiple ETA data points indicating an estimated time that customer is predicted to arrive at the physical store location, and each of the multiple ETA data points corresponding to a current location of the device at a different time;
        maintaining data indicating hours of pick-up of the physical store location, the hours of pick-up indicating times in which the physical store location is open for customers to pick up food items;
        determining, based on the multiple ETA data points and the hours of operation, that an ETA of the customer is after the hours of pick-up of the physical store location;
        sending, to the mobile application, a notification indicating that the ETA is after the hours of pick-up and alternative fulfillment options with respect to the order, the alternative fulfillment options including a first option to pick up the one or more food items at an alternative physical store location, a second option to schedule a delivery of the one or more food items to a delivery location associated with the customer, a third option for the customer to pick up the one or more food items from the physical store location at a subsequent time, and a fourth option to cancel the order; and
        receiving, from the mobile application, a second selection of one of the alternative fulfillment options.

2. The system as recited in claim 1, wherein the operations further comprise:
    determining an additional amount of time after the hour of pick-up; and
    determining, based on the ETA, that the customer is likely to arrive at the physical store location after the hour of pick-up plus the additional amount of time.

3. The system as recited in claim 1, wherein the operations further comprise:
    determining customer data associated with the customer, the customer data indicating previous instances in which the customer traveled to pick up food items from one or more physical store locations and one or more routes taken by the customer when traveling to the one or more physical store locations; and
    calculating a customer-based ETA with respect to an arrival of the customer at the physical store location based on the ETA and the customer data.

4. The system as recited in claim 1, wherein the operations further comprise:
    determining store data associated with the physical store location, the store data indicating routes taken by customers from different locations to a geographic location of the physical store location; and
    calculating a store-based ETA with respect to an arrival of the customer at the physical store location based on the ETA and the store data.

5. The system as recited in claim 1, wherein the operations further comprise:
    determining that the multiple ETA data points include a first ETA data point based on a first location of the customer at a first time, a second ETA data point based on a second location of the customer at a second time that is subsequent to the first time, and a third ETA data point based on a third location of the customer at a third time that is subsequent to the second time;

determining that a difference in time between the second ETA data point and at least one of the first ETA data point or the third ETA data point is equal to or greater than a threshold amount of time; and disregarding the second ETA data point when determining the ETA.

6. A method comprising:

receiving, from a device, an indication that a customer is initiating travel to a physical location to pick up one or more items;

determining, once the indication has been received, at least one estimated time of arrival (ETA) data point, the at least one ETA data point indicating a time in which the customer is predicted to arrive at the physical location;

determining that the time is subsequent to a predetermined time after which pick-up of items is not allowed at the physical location; and sending, to the device and based at least in part on the time being subsequent to the predetermined time, a notification identifying one or more alternative fulfillment options with respect to the one or more items, the one or more alternative fulfillment options including at least one of a first option to pick up the one or more items at an alternative physical location, a second option to schedule a delivery of the one or more items, a third option for the customer to pick up the one or more items from the physical location at a subsequent time, or a fourth option to cancel an order for the one or more items.

7. The method as recited in claim 6, further comprising:

determining that the at least one ETA data point includes a first ETA data point based at least in part on a first location of the customer at a first time, a second ETA data point based at least in part on a second location of the customer at a second time that is subsequent to the first time, and a third ETA data point based at least in part on a third location of the customer at a third time that is subsequent to the second time;

determining that a difference in time between the second ETA data point and at least one of the first ETA data point or the third ETA data point is equal to or greater than a threshold amount of time; and disregarding the second ETA data point when determining the ETA.

8. The method as recited in claim 6, further comprising:

determining customer data associated with the customer, the customer data indicating previous instances in which the customer traveled to pick up items from one or more physical locations and one or more routes taken by the customer when traveling to the one or more physical locations; and calculating a customer-based ETA with respect to an arrival of the customer at the physical location based at least in part on the customer data and an ETA generated from the at least one ETA data point.

9. The method as recited in claim 6, further comprising:

determining store data associated with the physical location, the store data indicating routes taken by customers from different locations to the physical location; and calculating a store-based ETA with respect to an arrival of the customer at the physical location based at least in part on the store data and an ETA generated from the at least one ETA data point.

10. The method as recited in claim 6, further comprising:

receiving, from the customer via the device, a selection of one of the one or more alternative fulfillment options; and sending, based at least in part on the selection and to a device associated with the physical location, an instruction to package the one or more items for delivery or to restage the one or more items at the physical location.

11. The method as recited in claim 6, wherein determining the at least one ETA data point comprises:

receiving, from the device, location data that indicates a current location of the device at different times; and calculating the at least one ETA data point based at least in part on the location data, the physical location, and a route taken by the customer to the physical location.

12. The method as recited in claim 6, further comprising determining the first option by:

identifying one or more alternative physical locations that offer item pick-up services for customers and that are within a threshold distance from the physical location or a location associated with the customer;

determining that a second ETA associated with the customer is prior to a second predetermined time after which pick-up of items is not allowed at the alternative physical location;

determining, based at least in part on an inventory of items at the alternative physical location, that at least one item of the one or more items is currently available for pick-up at the alternative physical location;

receiving, from the device, a selection to pick up the at least one item from the alternative physical location; and sending, to a device associated with the alternative physical location, an instruction to assemble the at least one item for pick-up by the customer.

13. The method as recited in claim 6, further comprising determining the second option by:

determining that the one or more items are eligible for delivery to the customer;

receiving, from the device, a selection to cause the one or more items to be delivered to a delivery location associated with the customer; and sending, to a device associated with the physical location, an instruction to package the one or more items for delivery.

14. The method as recited in claim 6, further comprising determining the third option by:

determining a subsequent availability of the physical location with respect to pick-up of the one or more items;

receiving, from the device, a selection to pick up the one or more items at the physical location at a subsequent time or during a subsequent time period; and sending, to a device associated with the physical location, an instruction relating to the pick-up of the one or more items at the subsequent time or during the subsequent time period.

15. A system comprising:

one or more processors;

memory; and one or more computer-executable instructions stored in the memory and executable by the one or more processors to perform operations comprising:

receiving, based at least in part on an indication that a customer is initiating travel to a physical location to pick up one or more items, at least one estimated time of arrival (ETA) data point, the at least one ETA data point indicating a time in which the customer is predicted to arrive at the physical location;

determining, based at least in part on data indicating an hours of pick-up of the physical location, a predetermined time after which pick-up of items is not allowed at the physical location;

determining that the time is after the predetermined time; and sending, to the a device associated with the customer and based at least in part on the time being after the predetermined time, a notification identifying one or more alternative fulfillment options with respect to the one or more items, the one or more alternative fulfillment options including at least one of a first option to pick up the one or more items at an alternative physical location, a second option to schedule a delivery of the one or more items, a third option for the customer to pick up the one or more items from the physical location at a subsequent time, or a fourth option to cancel an order for the one or more items.

16. The system as recited in claim 15, wherein the at least one ETA data point includes a first ETA data point based at least in part on a first location of the customer at a first time, a second ETA data point based at least in part on a second location of the customer at a second time that is subsequent to the first time, and a third ETA data point based at least in part on a third location of the customer at a third time that is subsequent to the second time.

17. The system as recited in claim 15, wherein the operations further comprise:

receiving, prior to the customer placing an order for the one or more items, a selection of a second physical location to pick up the one or more items;

determining an ETA of the customer with respect to the second physical location;

determining, second data indicating a second hours of pick-up of the second physical location, that the ETA is prior to a second predetermined time after which pick-up of items is not allowed at the second physical location; and sending, to the device, a second notification indicating that the ETA is prior to the second predetermined time.

18. The system as recited in claim 15, wherein the operations further comprise:

receiving, from the device, an indication that the customer is initiating travel to the physical location to pick up the one or more items; and receiving, in response to the indication, the at least one ETA data point.

19. The system as recited in claim 15, wherein the operations further comprise:

determining that a number of the at least one ETA data point meets or exceeds a threshold number; and determining, based at least in part on the at least one ETA data point meeting or exceeding the threshold number, that the time is after the predetermined time.

20. The system as recited in claim 15, wherein the operations further comprise:

determining that the at least one ETA data point corresponds to an arrival time at which the customer is estimated to arrive at the physical location;

determining that the arrival time meets or exceeds a threshold amount of time after the closing time; and determining, based at least in part on the arrival time meeting or exceeding the threshold amount of time after the closing time, that the time is after the predetermined time.

* * * * *